(12) United States Patent
Jang

(10) Patent No.: US 11,854,194 B2
(45) Date of Patent: Dec. 26, 2023

(54) METHOD AND SYSTEM FOR ANALYZING IMAGE

(71) Applicant: Lunit Inc., Seoul (KR)

(72) Inventor: Minje Jang, Seoul (KR)

(73) Assignee: LUNIT INC., Seoul (KR)

(*) Notice: Subject to any disclaimer, the term of this patent is extended or adjusted under 35 U.S.C. 154(b) by 204 days.

(21) Appl. No.: 17/375,876

(22) Filed: Jul. 14, 2021

(65) Prior Publication Data

US 2021/0342627 A1 Nov. 4, 2021

Related U.S. Application Data

(63) Continuation of application No. 16/694,826, filed on Nov. 25, 2019, now Pat. No. 11,100,359.

(30) Foreign Application Priority Data

Oct. 4, 2019 (KR) ........................ 10-2019-0123098

(51) Int. Cl.
*G06F 18/214* (2023.01)
*G06V 10/82* (2022.01)
(Continued)

(52) U.S. Cl.
CPC .......... *G06T 7/0012* (2013.01); *G06F 18/214* (2023.01); *G06F 18/25* (2023.01);
(Continued)

(58) Field of Classification Search
CPC .... G06F 18/214; G06F 18/2413; G06F 18/25; G06T 2207/10056; G06T 2207/20072;
(Continued)

(56) References Cited

U.S. PATENT DOCUMENTS 7,761,240 B2 * 7/2010 Saidi ................... G06V 20/695
382/128
10,395,772 B1 * 8/2019 Lucas ................. G06F 18/2431
(Continued)

FOREIGN PATENT DOCUMENTS

KR 10-2018-0077218 7/2018
KR 10-1889722 B1 8/2018
(Continued)

OTHER PUBLICATIONS

KIPO, Office Action of KR 10-2020-0004863 dated Nov. 14, 2022.
(Continued)

*Primary Examiner* — Tsung Yin Tsai
(74) *Attorney, Agent, or Firm* — LEX IP MEISTER, PLLC

(57) ABSTRACT

An image analysis method and an image analysis system are disclosed. The method may include extracting training raw graphic data including at least one first node corresponding to a plurality of histological features of a training tissue slide image, and at least one first edge defined by a relationship between the histological features and generating training graphic data by sampling the first node of the training raw graphic data. The method may also include determining a parameter of a readout function by training a graph neural network (GNN) using the training graphic data and training output data corresponding to the training graphic data, and extracting inference graphic data including at least one second node corresponding to a plurality of histological features of an inference tissue slide image, and at least one second edge decided by a relationship between the histological features of the inference tissue slide image.

20 Claims, 18 Drawing Sheets

(51) Int. Cl.
*G06T 7/00* (2017.01)
*G06V 10/426* (2022.01)
*G06V 20/69* (2022.01)
*G06F 18/25* (2023.01)
*G06V 10/764* (2022.01)
*G06V 10/774* (2022.01)
*G06V 10/80* (2022.01)

(52) U.S. Cl.
CPC .......... *G06V 10/426* (2022.01); *G06V 10/764* (2022.01); *G06V 10/774* (2022.01); *G06V 10/80* (2022.01); *G06V 10/82* (2022.01); *G06V 20/69* (2022.01); *G06T 2207/20072* (2013.01); *G06T 2207/20081* (2013.01); *G06T 2207/20084* (2013.01); *G06T 2207/30024* (2013.01); *G06V 2201/03* (2022.01)

(58) Field of Classification Search
CPC . G06T 2207/20081; G06T 2207/20084; G06T 2207/30024; G06T 7/0012; G06V 10/426; G06V 10/764; G06V 10/774; G06V 10/80; G06V 10/82; G06V 20/69; G06V 2201/03
See application file for complete search history.

(56) References Cited

U.S. PATENT DOCUMENTS

| | | | |
|---|---|---|---|
| 10,956,795 B2 * | 3/2021 | Madabhushi | G06V 30/19173 |
| 2006/0036372 A1 | 2/2006 | Yener et al. | |
| 2006/0064248 A1 * | 3/2006 | Saidi | G06V 20/695 |
| | | | 382/128 |
| 2014/0079297 A1 * | 3/2014 | Tadayon | G06V 40/172 |
| | | | 382/118 |
| 2018/0028079 A1 | 2/2018 | Gurevich et al. | |
| 2020/0184278 A1 * | 6/2020 | Zadeh | G06N 3/044 |
| 2020/0187790 A1 | 6/2020 | Milner et al. | |
| 2021/0081717 A1 * | 3/2021 | Creed | G06N 5/022 |
| 2021/0103757 A1 * | 4/2021 | Jang | G06F 18/25 |

FOREIGN PATENT DOCUMENTS

| | | |
|---|---|---|
| KR | 10-1889724 B1 | 8/2018 |
| KR | 10-1917947 B1 | 11/2018 |
| KR | 10-2019-0050698 A | 5/2019 |
| KR | 10-2019-0053695 A | 5/2019 |
| KR | 10-2019-0068607 A | 6/2019 |
| WO | 2019-081781 | 5/2019 |

OTHER PUBLICATIONS

KIPO, Decision of Rejection of KR 10-2020-0004863 dated May 30, 2023.

Yanning Zhou et al., "CGC-Net: Cell Graph Convolutional Network for Grading of Colorectal Cancer Histology Images", ICCVW 2019.09.

Minwoo Lee et al., "Text Classification via Sentence-level Graph Convolutional Networks", KIISE Transactions on Computing Practices, vol. 25, No. 8, pp. 397-401, 2019. 8, https://doi.org/10.5626/KTCP.2019.25.8.397.

KIPO, Notice of Allowance of KR 10-2020-0004863 dated Sep. 26, 2023.

* cited by examiner

METHOD AND SYSTEM FOR ANALYZING IMAGE

CROSS-REFERENCE TO RELATED APPLICATIONS

This application is a continuation of U.S. application Ser. No. 16/694,826, filed Nov. 25, 2019, which claims the priority of Korean Patent Application No. 10-2019-0123098, filed on Oct. 4, 2019, in the Korean Intellectual Property Office, the disclosures of each of which are hereby incorporated by reference in their entireties.

BACKGROUND

1. Technical Field

The present disclosure relates to a method and system for analyzing images, and more particularly to a method and system for analyzing images using a graph neural network (GNN).

2. Description of Related Technology

Whole slide image (WSI) may denote a tissue slide image formed by separation of some parts from patient's tissues. WSI may include various kinds of information about cancer cells and white blood cells (WBC), for example, information about the number of cancer cells, information about leukocyte (or white blood cell WBC) count, information about arrangements and shapes of the cancer cells and white blood cells, etc.

Based on such WSI information, various pathological diagnoses, such as the effects of anticancer drug responses in patients or the expected residual lifetime of each patient, can be derived by machine learning.

Traditional machine learning techniques may extract various features from WSI information, and may perform training of hypotheses or functions using machine learning. However, since the traditional machine learning techniques can easily analyze functions based on WSI information while simultaneously using simple mathematical models using WSI information, the traditional machine learning may have difficulty in extracting features needed to diagnose high-level pathological information such as the effects of anticancer drug responses. That is, in order to perform training of appropriate diagnostic models needed for feature extraction, medical knowledge and expertise in machine learning are essentially needed.

On the other hand, from among deep learning techniques, there is another learning technology for performing such training by inputting all pixels of WSI into a neural network. However, the above-mentioned learning technology has disadvantages in that the WSI has a much higher capacity, such that speed and efficiency in operations may be greatly degraded and therefore much more resources are needed.

SUMMARY

Accordingly, the present disclosure is directed to a method and system for analyzing images that substantially obviate one or more problems due to limitations and disadvantages of the related art.

Therefore, the present disclosure has been made in view of the above problems, and it is an aspect of the present disclosure to provide an image analysis method appropriate for estimating efficient and high-level information.

It is another aspect of the present disclosure to provide a non-transitory computer-readable recording medium in which graphical data appropriate for estimating efficient and high-level information.

It is another aspect of the present disclosure to provide a computer program stored in a computer-readable recording medium appropriate for estimating efficient and high-level information.

It is another aspect of the present disclosure to provide an image analysis system appropriate for estimating efficient and high-level information.

Additional advantages, aspects, and features of the invention will be set forth in part in the description which follows and in part will become apparent to those having ordinary skill in the art upon examination of the following or may be learned from practice of the invention. The aspects and other advantages of the invention may be realized and attained by the structure particularly pointed out in the written description and claims hereof as well as the appended drawings.

To achieve these and other advantages and in accordance with the purpose of the invention, as embodied and broadly described herein, an image analysis method includes extracting training raw graphic data that includes at least one first node corresponding to a plurality of histological features of a training tissue slide image, and at least one first edge defined by a relationship between the histological features of the training tissue slide image, generating training graphic data by sampling the first node of the training raw graphic data, determining a parameter of a readout function by training a graph neural network (GNN) using the training graphic data and training output data corresponding to the training graphic data, extracting inference graphic data that includes at least one second node corresponding to a plurality of histological features of an inference tissue slide image, and at least one second edge decided by a relationship between the histological features of the inference tissue slide image, and deriving inference output data by the readout function after inputting the inference graphic data to the graph neural network (GNN).

In accordance with one aspect of the present disclosure, a computer program stored in a non-transitory computer-readable recording medium includes, in combination with a computing device, extracting training raw graphic data that includes at least one first node corresponding to a plurality of histological features of a training tissue slide image, and at least one first edge defined by a relationship between the histological features of the training tissue slide image, generating training graphic data by sampling the first node of the training raw graphic data, determining a parameter of a readout function and a parameter of an update function by training a graph neural network (GNN) using the training graphic data and training output data corresponding to the training graphic data, extracting inference raw graphic data that includes at least one second node corresponding to a plurality of histological features of an inference tissue slide image, and at least one second edge decided by a relationship between the histological features of the inference tissue slide image, generating training graphic data by sampling the second node of the inference raw graphic data, updating feature information of the second node using the update function, and deriving inference output data by the readout function after inputting the inference graphic data to the graph neural network (GNN).

In accordance with another aspect of the present disclosure, an image analysis system includes a storage unit configured to store a computer program therein, and a processing unit configured to execute the computer program.

The computer program includes an operation for generating training raw graphic data that includes at least one first node corresponding to a plurality of histological features of a training tissue slide image, and at least one first edge defined by a relationship between the histological features of the training tissue slide image, an operation for generating training graphic data by sampling the first node of the training raw graphic data, an operation for determining a parameter of a readout function by training a graph neural network (GNN) using the training graphic data and training output data corresponding to the training graphic data, an operation for extracting inference raw graphic data that includes at least one second node corresponding to a plurality of histological features of an inference tissue slide image, and at least one second edge decided by a relationship between the histological features of the inference tissue slide image, an operation for generating training graphic data by sampling the second node of the inference raw graphic data, an operation for updating feature information of the second node using the update function, and an operation for deriving inference output data by the readout function after inputting the inference graphic data to the graph neural network (GNN).

It is to be understood that both the foregoing general description and the following detailed description of the present disclosure are explanatory and are intended to provide further explanation of the invention as claimed.

BRIEF DESCRIPTION OF DRAWINGS

The foregoing and other aspects, features, and advantages of the invention, as well as the following detailed description of embodiments, will be better understood when read in conjunction with the accompanying drawings. For the purpose of illustrating the present disclosure, there is shown in the drawings a non-limiting example embodiment, it being understood, however, that the present disclosure is not intended to be limited to the details shown because various modifications and structural changes may be made therein without departing from the spirit of the present disclosure and within the scope and range of equivalents of the claims. The use of the same reference numerals or symbols in different drawings indicates similar or identical items.

The above and other aspects, features, and advantages of the present disclosure will become apparent from the detailed description of the following aspects in conjunction with the accompanying drawings, in which.

DETAILED DESCRIPTION

Figure 1:
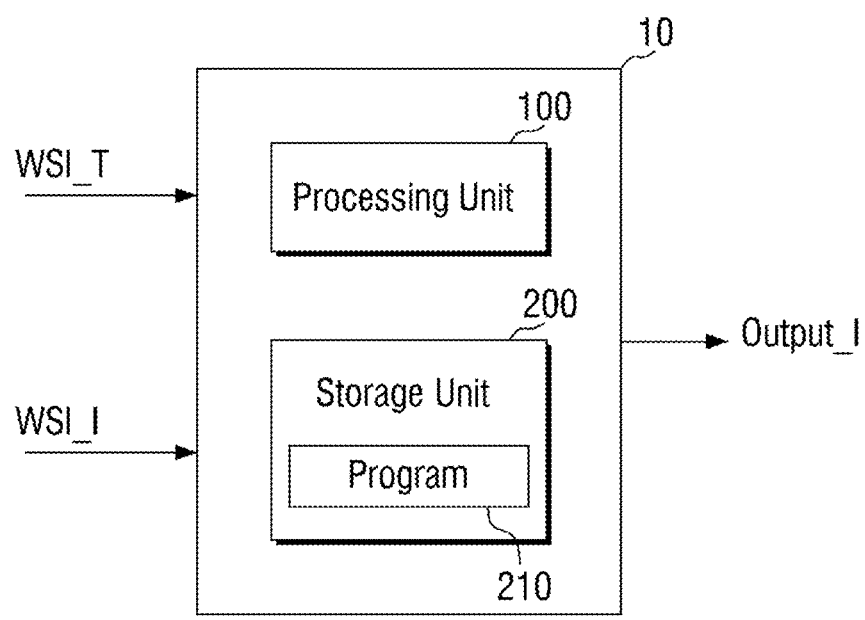
FIG. 1 is a block diagram illustrating an image analysis system according to some embodiments of the present disclosure.

Advantages and features of the present disclosure and a method of achieving the advantages and features of the present disclosure will be clearly understood from embodiments described hereinafter in conjunction with the accompanying drawings. However, the present disclosure is not limited to the following embodiments and may be realized in various different forms. These embodiments are provided only to completely disclose the present disclosure and for a person having ordinary skill in the art to which the present disclosure pertains to completely understand the category of the disclosure. That is, the present disclosure is defined only by the claims. The same reference numbers will be used throughout this specification to refer to the same parts.

Terms to be used in the following embodiments will hereinafter be described in detail, and a detailed description of embodiments is as follows.

Although most terms of elements in this specification have been selected from general ones widely used in the art taking into consideration functions thereof in this specification, the terms may be changed depending on the intention or convention of those skilled in the art or the introduction of new technology. Some terms have been arbitrarily selected by the applicant and their meanings are explained in the following description as needed. Thus, the terms used in this specification should be construed based on the overall content of this specification together with the actual meanings of the terms rather than their simple names or meanings.

The terminology used herein is for the purpose of describing particular example embodiments only and is not intended to be limiting. As used herein, the singular forms "a," "an," and "the" may be intended to include the plural forms as well, unless the context clearly indicates otherwise. Terms used in the following description are used only to describe the specific embodiments and are not intended to restrict the present disclosure. A singular expression may include a plural expression unless otherwise stated in context.

Throughout the specification of the present disclosure, if it is assumed that a certain part includes a certain component, the term "comprising" or "including" means that a corresponding component may further include other components unless a specific meaning opposed to the corresponding component is written.

The term "module", "portion", or "unit" may include software components or hardware components to perform a specific function. However, the term "module" (portion or circuit) is not limited to software or hardware. The module (portion or circuit) may be configured to be present in an addressable storage medium or to execute one or more processors. For example, the module (portion or circuit) may include components, such as software components, object-oriented software components, class components, and task components, processes, functions, attributes, procedures, subroutines, segments of program code, drivers, firmware, microcode, circuitry, data, databases, data structures, tables, arrays, and variables. Functions provided by the components and modules may be combined into fewer components and modules or further divided into additional components and modules.

According to one embodiment of the present disclosure, the term "unit", "portion", or "module" may be implemented as a processor and/or a memory. The term "processor" may include a general-purpose processor, a Central Processing Unit (CPU), a microprocessor, a Digital Signal Processor (DSP), a controller, a microcontroller, a state machine, etc. In some environments, the term "processor" may also refer to an Application Specific Integrated Circuit (ASIC), a Programmable Logic Device (PLD), a Field Programmable Gate Array (FPGA), etc. For example, the term "processor" may also refer to a combination of various processing devices, for example, a combination of a DSP and a microprocessor, a combination of a plurality of microprocessors, a combination of one or more microprocessors connected to a DSP core, a combination of other arbitrary constituent elements, etc.

The term "memory" may include an arbitrary electronic component capable of storing electronic information. The term "memory" may include various kinds of processor readable media, for example, a random access memory (RAM), a read only memory (ROM), a nonvolatile random access memory (NVRAM), a programmable read-only memory (PROM), an electrically erasable programmable read-only memory (EEPROM), an erasable programmable read-only memory (EPROM), a flash memory, a magnetic or optical data storage device, registers, etc. If the processor can read information from the memory and can write information in the memory, the memory is referred to as being in an electronic communication state with the processor. The memory integrated into the processor may be in the electronic communication state with the processor.

Embodiments of the present disclosure will be described in detail so that those skilled in the art may readily implement the present disclosure. However, the present disclosure may be implemented in different manners, not limited to the embodiments described herein. Parts that are not related to a description of the present disclosure are omitted in the drawings and like reference numerals denote the same components through the disclosure.

A system and method for analyzing images according to some embodiments of the present disclosure will hereinafter be described with reference to FIGS. 1 to 12.

FIG. 1 is a block diagram illustrating an image analysis system according to some embodiments of the present disclosure.

Referring to FIG. 1, the image analysis system according to embodiments of the present disclosure may include an image analysis device 10. The image analysis device 10 may receive a training tissue slide image (WSI_T) and an inference tissue slide image (WSI_I). The image analysis device 10 may construct an analysis model by training an internal Graph Neural Network (GNN) through the training tissue slide image (WSI_T), and may output inference output data (Output_I) by applying the inference tissue slide image (WSI_I) to the analysis model.

The image analysis device 10 may include a processing unit 100 and a storage unit 200. The processing unit 100 may load a computer program 210 stored in the storage unit 200, and may execute the loaded computer program 210. The processing unit 100 may control overall operation of constituent elements contained in the image analysis device 10. The processing unit 100 may include a central processing unit (CPU), a microprocessor unit (MPU), a micro controller unit (MCU), a graphic processing unit (GPU), or may include any type of processor well known in the art. The image analysis device 10 may include one or more processing units 100.

The storage unit 200 may store the computer program 210 therein. The storage unit 200 may store data to be loaded or executed by the processing unit 100. For example, the storage unit 200 may include a nonvolatile memory (e.g., a read only memory (ROM), an erasable programmable ROM (EPROM), an electrically erasable programmable ROM (EEPROM), a flash memory, etc.), a hard disk drive (HDD), a removable disk, or any type of computer-readable recording medium well known in the art to which the present disclosure pertains.

The computer program 210 may detect various biological indicators from the training tissue slide image (WSI_T) and the inference tissue slide image (WSI_I) according to embodiments of the present disclosure, and may perform operation of outputting the inference output data (Output_I) indicating either the result of pathological diagnosis or the result of medical prediction about target tissues to be diagnosed based on biological indices.

Figure 2:
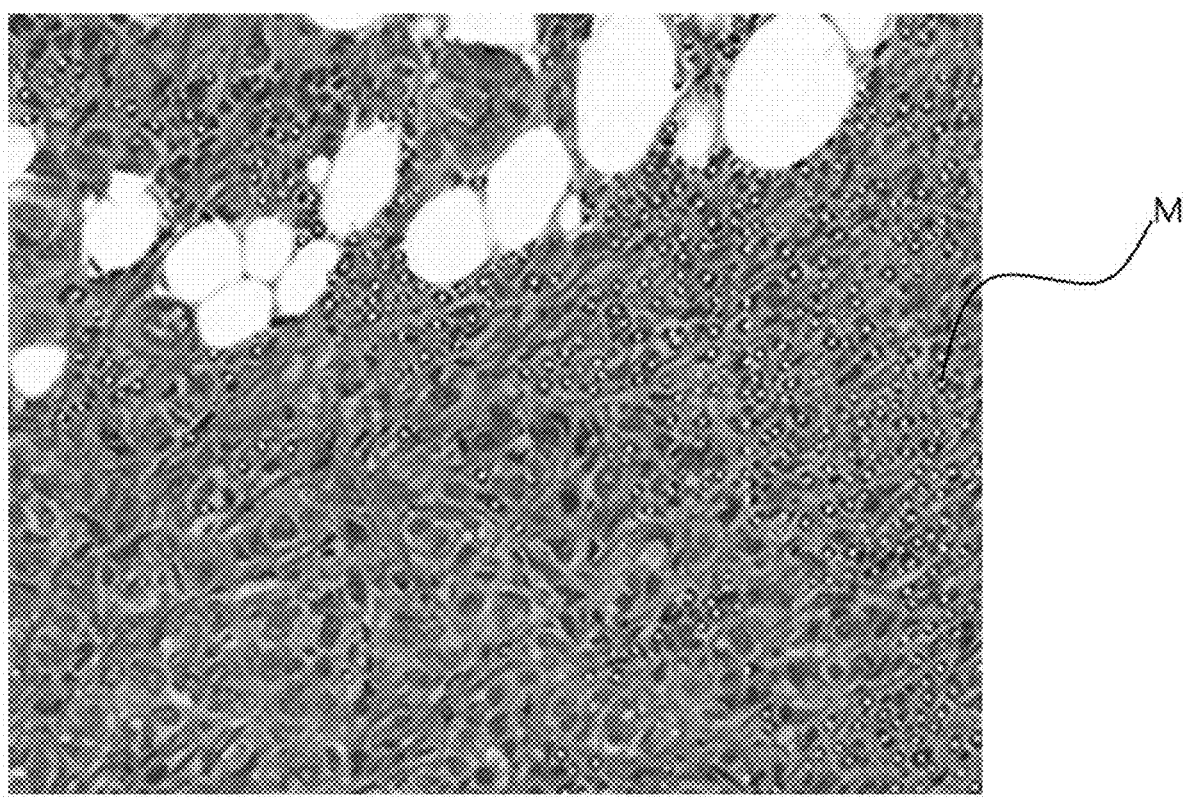
FIG. 2 is a view illustrating an example of a tissue slide image applied to the system and method for analyzing images according to some embodiments of the present disclosure.

FIG. 2 is a view illustrating a tissue slide image applied to the system and method for analyzing images according to some embodiments of the present disclosure.

Referring to FIGS. 1 and 2, the tissue slide image of FIG. 2 may be an example of the training tissue slide image (WSI_T) or the inference tissue slide image (WSI_I). Differently from the inference tissue slide image (WSI_I), the training tissue slide image (WSI_T) may be formed in a label shape. The training output data may refer to a kind of pathological diagnosis result. The training output data may include one or more binary values. For example, in a situation in which the training output data is information about the presence or absence of anticancer drug response(s), if the training output data is information about the presence of anticancer drug response(s), the training output data may be set to '1', and if the training output data is information about the absence of anticancer drug response(s), the training output data may be set to zero '0'.

Alternatively, the training output data may have a discrete value rather than a binary value. For example, if the training output data is information about "how many years are expected to be the residual lifetime of each patient", the training output data may have at least three values depending on predetermined setting information. In this case, respective values should not overlap with each other. Additionally, if the sum of the respective values is acquired, the training output data should be determined in consideration of all available cases.

Since the inference tissue slide image (WSI_I) does not have separate output data (label) unlike the training tissue slide image (WSI_T), the image analysis device 10 should derive the inference output data (Output_I). At this time, the derived inference output data (Output_I) may be selected from among consecutive values unlike the training output data. For example, if the training output data is information about the presence or absence of anticancer drug response(s) and has values of '1' and '0', the inference output data (Output_I) corresponding to the values '1' and '0' may have a specific value such as '0.7' between '1' and '0'. In this case, the inference output data (Output_I) can be interpreted as the probability of 0.7 indicating the presence of anticancer drug responses.

The tissue slide image shown in FIG. 2 may include a mark (M) displayed on the image of real tissue. The mark (M) may be displayed at a location of histological features of the tissue slide image. The mark (M) may be represented by a first node or a second node in subsequent graphic data. Here, the histological features may conceptually include cells, structures such as blood vessels, and tissues.

Figure 3:
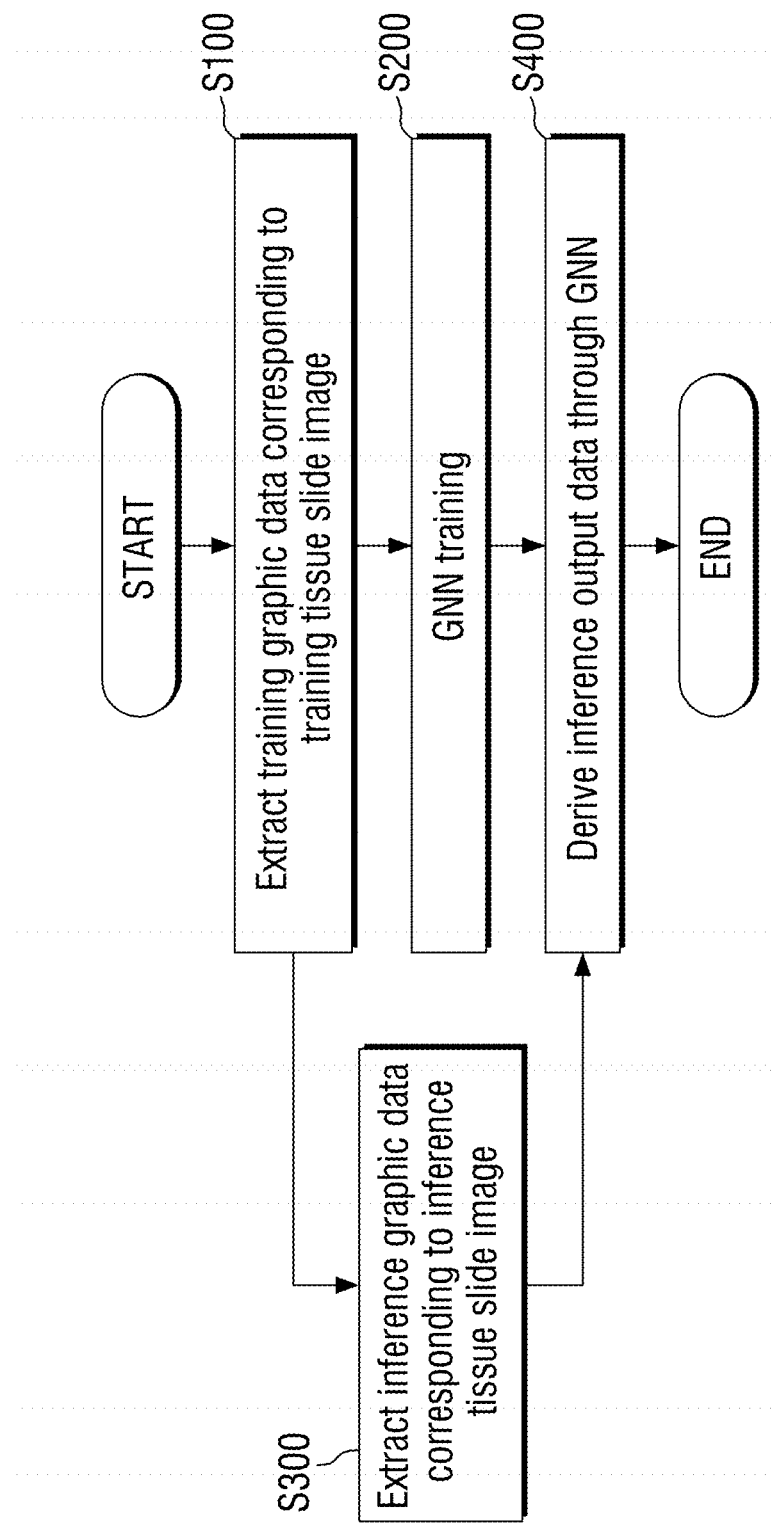
FIG. 3 is a flowchart illustrating an image analysis method for use in the image analysis system according to some embodiments of the present disclosure.
Figure 4:
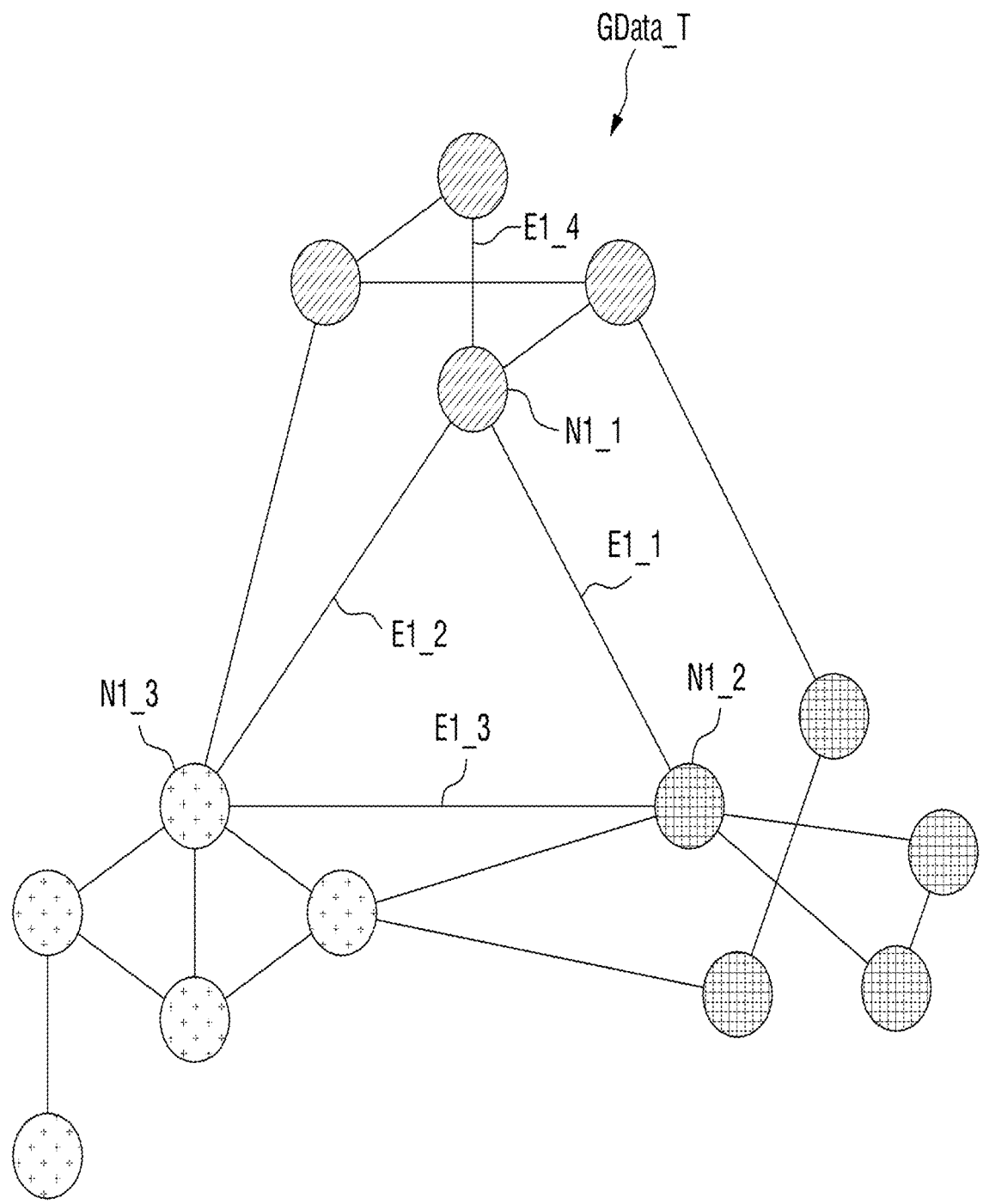
FIG. 4 is an example view illustrating training graphic data applied to the system and method for analyzing images according to some embodiments of the present disclosure.
Figure 5:
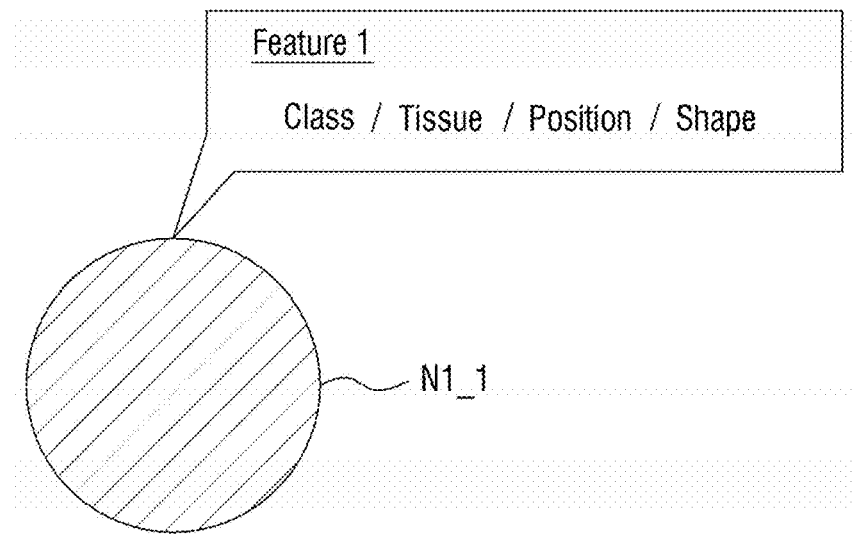
FIG. 5 is a view illustrating features embedded in a first node shown in FIG. 4 according to the present disclosure.
Figure 6:
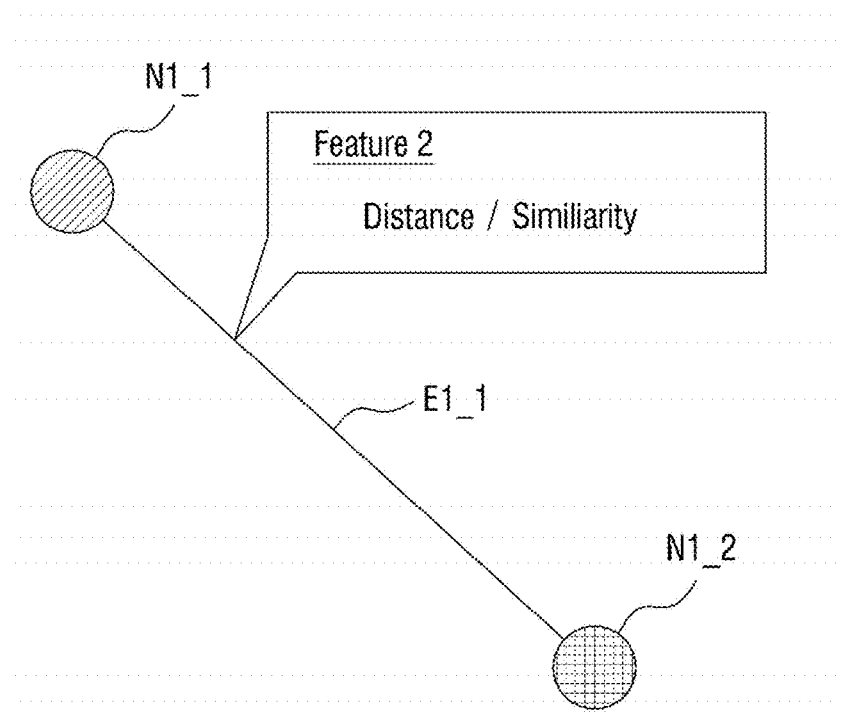
FIG. 6 is a view illustrating features embedded in a first edge shown in FIG. 4 according to the present disclosure.

FIG. 3 is a flowchart illustrating an image analysis method for use in the image analysis system according to some embodiments of the present disclosure. FIG. 4 is an example view illustrating training graphic data applied to the system and method for analyzing images according to some embodiments of the present disclosure. FIG. 5 is a view illustrating features embedded in a first node shown in FIG. 4 according to the present disclosure. FIG. 6 is a view illustrating features embedded in a first edge shown in FIG. 4 according to the present disclosure.

Referring to FIG. 3, training graph data corresponding to the training tissue slide image may be extracted (S100).

In more detail, as shown in FIGS. 1, 2 and 4, training graphic data (GData_T) may include first nodes (N1_1, N1_2, N1_3) corresponding to histological features of the training tissue slide image (WSI_T). The first nodes (N1_1, N1_2, N1_3) may correspond to the mark (M) when the image of FIG. 2 is the tissue slide image (WSI_T). The training graphic data (GData_T) may include a plurality of first nodes (N1_1, N1_2, N1_3). The first nodes (N1_1, N1_2, N1_3) may be classified into first sub-nodes (N1_1, N1_2, N1_3) having different classes. In more detail, the first nodes may be classified into the 1_1 node (N1-1), the 1_2 node (N1_2), and the 1_3 node (N1_3).

Although the first nodes (N1_1, N1_2, N1_3) of FIG. 4 have three classes for convenience of description and better understanding of the present disclosure, the scope or spirit of the present disclosure is not limited thereto. That is, the number of classes of the first nodes (N1_1, N1_2, N1_3) may be set to 4 or greater, or may be less than 3.

The training graphic data (GData_T) may include first edges (E1_1, E1_2, E1_3, E1_4). The first edges (E1_1, E1_2, E1_3, E1_4) may be defined by the relationship between the first nodes (N1_1, N1_2, N1_3). Each of the first edges (E1_1, E1_2, E1_3, E1_4) may be represented by a segment for interconnecting two first nodes. The first edges (E1_1, E1_2, E1_3, E1_4) may include the 1_1 edge (E1-1), the 1_2 edge (E1_2), and the 1_3 edge (E1_3). The 1_1 edge (E1-1), the 1_2 edge (E1_2), and the 1_3 edge (E1_3) may be respectively connected to the first nodes (N1_1, N1_2, N1_3) having different classes. In more detail, the 1_1 edge (E1_1) may connect the 1_1 node (N1_1) to the 1_2 node (N1_2). The 1_2 edge (E1_2) may connect the 1_1 node (N1_1) to the 1_3 node (N1_3). The 1_3 edge (E1_3) may connect the 1_2 node (N1_2) to the 1_3 node (N1_3).

Of course, the first edges (E1_1, E1_2, E1_3, E1_4) may further include another edge (i.e., the 1_4 edge (E1_4)) through which the 1_1 nodes (N1_1), the 1_2 nodes (N1_2), or the 1_3 nodes (N1_3) are interconnected.

Although the first edges (E1_1, E1_2, E1_3, E1_4) have been defined according to the relationship between two first nodes for convenience of description, the scope or spirit of the present disclosure is not limited thereto. In the system and method for analyzing images according to some embodiments of the present disclosure, one first edge may also be defined by the relationship between three or more first nodes using the form of a hypergraph. That is, only one first edge may also be defined not only by the plurality of first nodes, but also by the relationship between the first nodes.

The training graphic data (GData_T) may include training output data shaped in a label. Here, the label-shaped training output data may correspond to the training graphic data (GData_T). In this case, the training output data may be inherited from the label shape of the training tissue slide image (WSI_T) corresponding to the training graphic data (GData_T).

Referring to FIG. 5, first feature information (Feature 1) about characteristics of the histological features may be embedded in each of the first nodes (N1_1, N1_2, N1_3). Although FIG. 5 illustrates only the 1_1 node (N1_1) as an example, first feature information (Feature 1) may also be embedded in each of the other first nodes (N1_2, N1_3) other than the 1_1 node (N1_1). Of course, the first feature information (Feature 1) embedded in each of the first nodes (N1_1, N1_2, N1_3) may have a unique value. That is, the first feature information (Feature 1) embedded in the first node (N1_1), the first feature information (Feature 1) embedded in the first node (N1_2), and the first feature information (Feature 1) embedded in the first node (N1_3) may have different values.

The term "embedding" described above may indicate that the first feature information (Feature 1) is attached and stored in each of the first nodes (N1_1, N1_2, N1_3). The first feature information (Feature 1) may indicate characteristics of histological features corresponding to the first nodes (N1_1, N1_2, N1_3), and may include at least one of class information, tissue information, position information, and shape information of the histological features. As shown in FIG. 4, the first nodes (N1_1, N1_2, N1_3) of the training graphic data (GData_T) may intuitively display class information selected from among the first feature information (Feature 1) of the first nodes (N1_1, N1_2, N1_3) using different colors or different hatches. However, the scope or spirit of the present disclosure is not limited thereto.

Class information (Class) selected from among the first feature information (Feature 1) may refer to a kind of histological features. For example, in the training tissue slide image (WSI_T) about lung tissue, class information (Class) may be any one of lymphoplasma cells, fibroblasts, macrophages, tumor cells, endothelial cells, and blood vessels.

Tissue information (Tissue) selected from among the first feature information (Feature 1) may indicate which one of tissues includes histological features corresponding to each of the first nodes (N1_1, N1_2, N1_3). Position information (Position) may refer to a correct position of histological features corresponding to each of the first nodes (N1_1, N1_2, N1_3). Shape information (Shape) may refer to the shape of histological features corresponding to each of the first nodes (N1_1, N1_2, N1_3).

In the system and method for analyzing images according to some embodiments of the present disclosure, the types of the above-mentioned first feature information (Feature 1) are merely exemplary, the scope or spirit of the present disclosure is not limited thereto, and any other kinds of information may also be included in the first feature information (Feature 1) depending on needs and purposes.

Referring to FIGS. 4 and 6, the second feature information (Feature 2) about the relationship between the first nodes (N1_1, N1_2, N1_3) may be embedded in each of the first edges (E1_1, E1_2, E1_3, E1_4). Although only the 1_1 edge (E1_1) between the 1_1 node (N1_1) and the 1_2 node (N1_2) is shown in FIG. 6 for convenience of description, the scope or spirit of the present disclosure is not limited thereto, and the second feature information (Feature 2) may also be embedded in each of the other first edges (E1_2, E1_3, E1_4) other than the 1_1 edge (E1_1) in the same manner as in the 1_1 edge (E1_1). Of course, the second feature information (Feature 2) embedded in each of the first edges (E1_1, E1_2, E1_3, E1_4) may have a unique value. That is, the second feature information (Feature 2) embedded in the first edge (E1_1), the second feature information (Feature 2) embedded in the first edge (E1_2), the second feature information (Feature 2) embedded in the first edge (E1_3), and the first feature information (Feature 2) embedded in the first edge (E1_4) may have different values. The second feature information (Feature 2) may refer to characteristics of the relationship between two histological features corresponding to two first nodes, and may include information of at least one of a distance and similarity between the histological features corresponding to the two first nodes.

Distance information (Distance) selected from among the second feature information (Feature 2) may refer to information about the distance between histological features corresponding to two first nodes. Here, the distance information (Distance) may refer to unprocessed distance information (also called raw distance information), or may refer to processed distance information.

In a situation in which the distance information (Distance) is the processed distance information, if the distance is shorter than a threshold distance, the distance information (Distance) may be set to '1' such that the distance information (Distance) of '1' may then be stored, and if the distance is longer than the threshold distance, the distance information (Distance) may be set to '0' such that the distance information (Distance) of '1' may then be stored. If the distance information (Distance) is set to '0', each of the first edges (E1_1, E1_2, E1_3, E1_4) may not be displayed in the training graphic data (GData_T). Further, the first edges (E1_1, E1_2, E1_3, E1_4) may not be formed between histological features located farther than the threshold distance. However, the scope or spirit of the present disclosure is not limited thereto. That is, the first edges (E1_1, E1_2, E1_3, E1_4) may be formed among all of the first nodes (N1_1, N1_2, N1_3), and the distance information (Distance) of '1' or '0' may also be embedded in each of the first edges as needed.

In addition, if the distance information (Distance) is the unprocessed actual distance information (i.e., raw distance information), a method of allocating a weight to a node corresponding to a closer distance may also be used when the graph neural network (GNN) is trained later, and a detailed description thereof will be described later.

Similarity information (Similarity) selected from among the second feature information (Feature 2) may refer to the degree of similarity between histological features corresponding to two first nodes (N1_1, N1_2, N1_3). At this time, in a situation in which the first feature information (Feature 1) of one first node from among two first nodes is represented by one vector and the first feature information (Feature 1) of the other first node is represented by the other vector, the similarity information (Similarity) may be measured as cosine similarity between two vectors. However, the scope or spirit of the present disclosure is not limited thereto.

Referring back to FIG. 3, the graph neural network (GNN) may be trained (S200).

Figure 7:
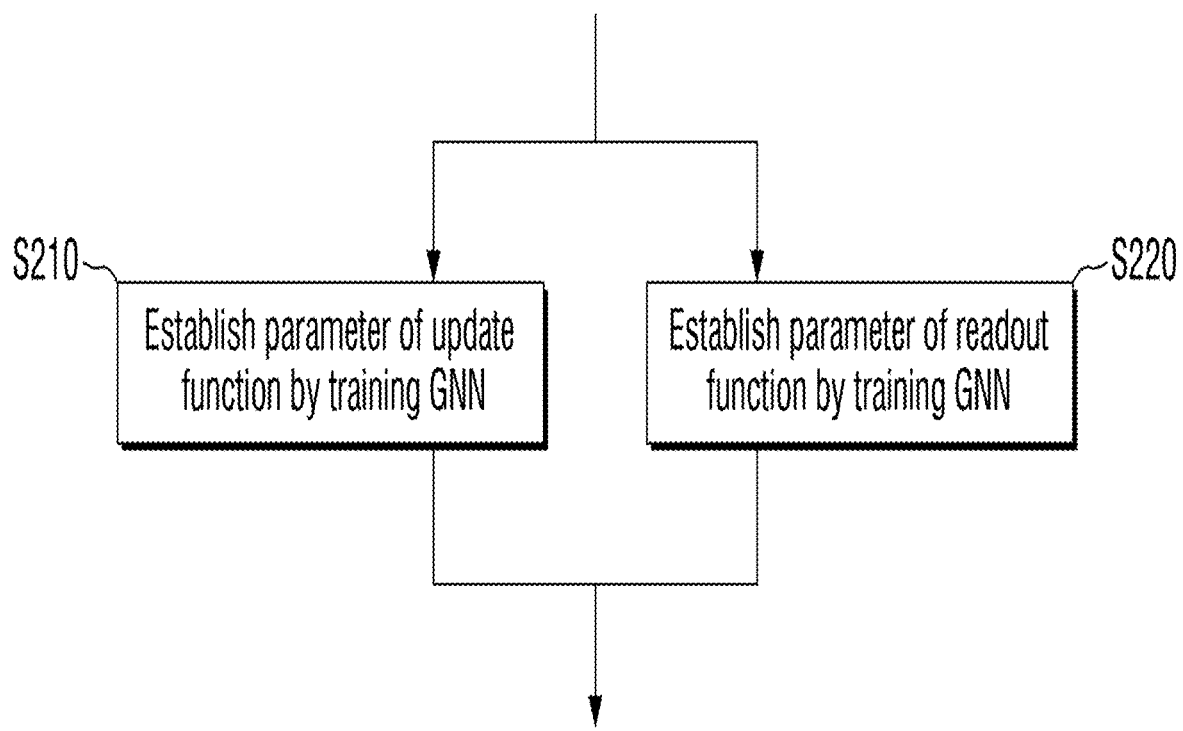
FIG. 7 is a detailed flowchart illustrating a graph neural network (GNN) training step shown in FIG. 3 according to the present disclosure.

FIG. 7 is a detailed flowchart illustrating the graph neural network (GNN) training step S200 shown in FIG. 3 according to the present disclosure.

Referring to FIG. 7, the GNN training step S200 may include the following two steps to be performed in a parallel mode.

That is, the GNN is trained so that a parameter of an update function may be decided and established (S210). The GNN is trained so that a parameter of a readout function may be decided and established (S220).

Step S210 for establishing the parameter of the update function will hereinafter be described with reference to FIG. 8.

Figure 8:
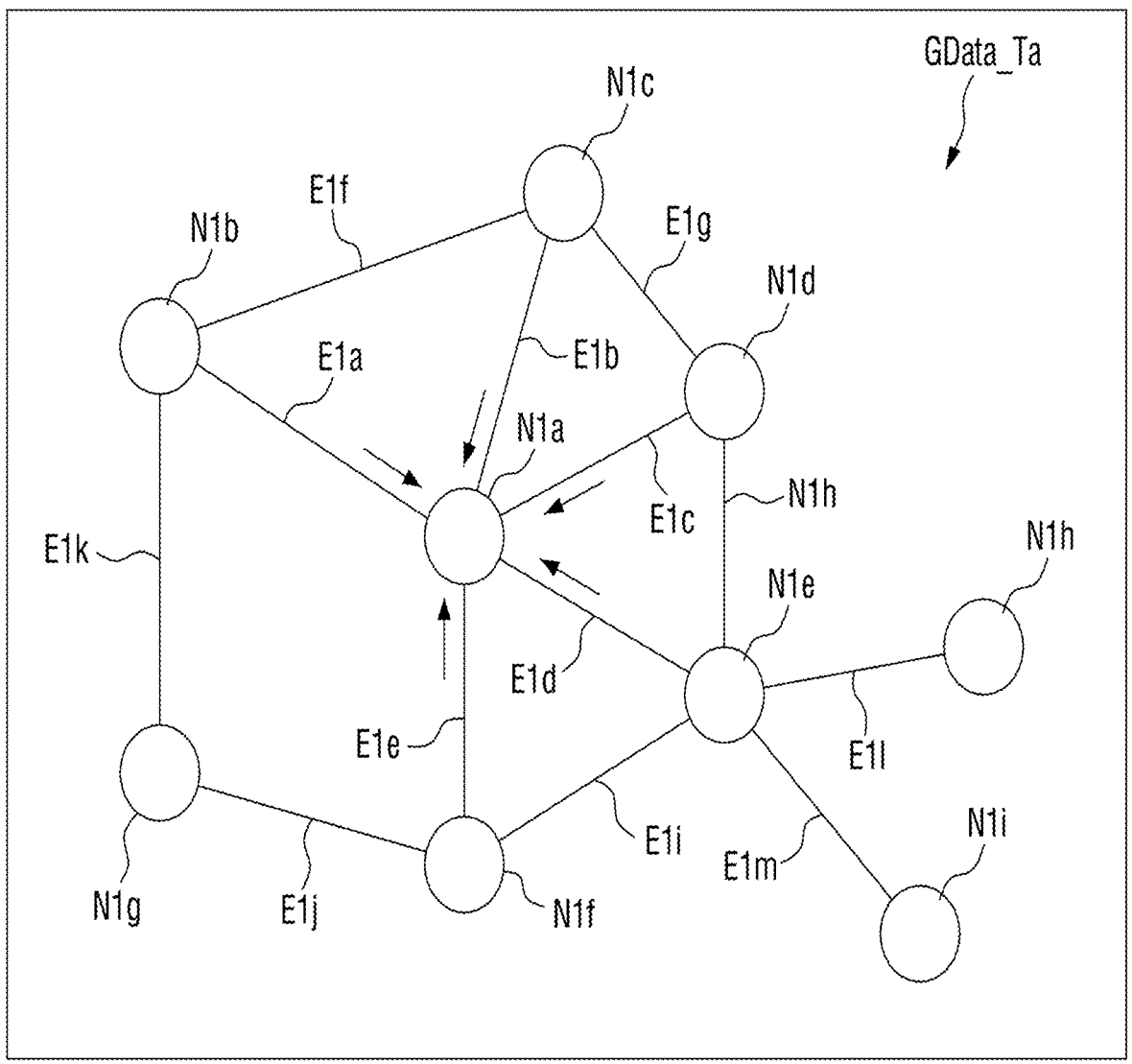
FIG. 8 is a conceptual diagram illustrating examples of methods for training an update function and a readout function according to the present disclosure.

FIG. 8 is a conceptual diagram illustrating examples of methods for training an update function and a readout function according to the present disclosure.

Referring to FIG. 8, the first graphic data (GData_Ta) may include a plurality of first nodes (N1a~N1i) and a plurality of first edges (E1a~E1m). Here, the first nodes (N1a~N1i) may be connected to one another through the plurality of first edges (E1a~E1m). Although the first graphic data (GData_Ta) of FIG. 8 includes 9 first nodes (N1a~N1i) and 14 first edges (E1a~E1m) for convenience of description, the scope or spirit of the present disclosure is not limited thereto. The first graphic data (GData_Ta) may correspond to the training graphic data (GData_T) of FIG. 4.

In order to update the first feature information of the first_a node (N1a) of the first graphic data (GData_Ta), the second feature information of the first_a edge (E1a), the first_b edge (E1b), the first_c edge (E1c), the first_d edge (E1d), and the first_e edge (E1e), each of which is connected to the first_a node (N1a), is needed. In addition, first feature information of contiguous nodes of the first_a node (N1a) may also be needed.

In this case, the term "contiguous node" may refer to a first node that is contiguous to a target first node to be updated in the first graphic data (GData_Ta). If the contiguous degree is set to a single edge, the contiguous node of the first_a node (N1a) may be defined to include the first_b node (N1b), the first_c node (N1c), the first_d node (N1d), the first_e node (N1e), and the first_f node (N1f). This is because the first_b node (N1b) is contiguous to the first_a node (N1a) through the first_a edge (E1a), the first_d node (N1d) is contiguous to the first_a node (N1a) through the first_c edge (E1c), the first_e node (N1e) is contiguous to the first_a node (N1a) through the first_d edge (E1d), and the first_f node (N1f) is contiguous to the first_a node (N1a) through the first_e edge (E1e). On the other hand, since each of the first_g node (N1g), the first_h node (N1h), and the first_i node (N1i) does not include a first edge directly connected thereto, each of the first_g node (N1g), the first_h node (N1h), and the first_i node (N1i) is not used as the contiguous node.

If the contiguous degree is set to two edges, not only the first_b node (N1b), the first_c node (N1c), the first_d node (N1d), the first_e node (N1e), and the first_f node (N1f), but also the first_g node (N1g), the first_h node (N1h), and the first_i node (N1i) may be defined as the contiguous nodes of the first_a node (N1a). This is because the first_g node (N1g) is contiguous to the first_a node (N1a) through two edges (i.e., through the first_e edge (E1e) and the first_j edge (E1j) or through the first_a edge (E1a) and the first_k edge (E1k)), the first_h node (N1h) is contiguous to the first_a node (N1a) through two edges (i.e., through the first_d edge (E1d) and the first_l edge (E1l)), and the first_i node (N1i) is contiguous to the first_a node (N1a) through two edges (i.e., through the first_d edge (E1d) and the first_m edge (E1m)). The contiguous degree may be set in advance in consideration of the accuracy of update results, the allowable limit of resources, and so on.

If the contiguous degree is set to only one edge, there may be an update function (f). In association with the update function (f), the first feature information of the first_a node (N1a) may be used as output information of the update function (f), and the first feature information of each contiguous node (i.e., the first_b node (N1b), the first_c node (N1c), the first_d node (N1d), the first_e node (N1e), and the first_f node (N1f)) and the second feature information of each of the first_a edge (E1a), the first_b edge (E1b), the first_c edge (E1c), the first_d edge (E1d), and the first_e edge (E1e) may be used as input information of the update function (f). The update function (f) may be trained in plural training graphic data over the graph neural network (GNN), such that one or more parameters of the update function (f) can be decided and established. In other words, the graph neural network (GNN) may decide and establish one or more parameters of the update function (f) so as to estimate the relationship between the above-mentioned input information (i.e., the first feature information of the first_b node (N1b), the first_c node (N1c), the first_d node (N1d), the first_e node (N1e), and the first_f node (N1f) and the second feature information of the first_a edge (E1a), the first_b edge (E1b), the first_c edge (E1c), the first_d edge (E1d), and the first_e edge (E1e)) and the above-mentioned output information (i.e., first feature information of the first_a node (N1a)).

That is, the graph neural network (GNN) may determine one or more parameters of the update function (f) through plural training graphic data in a training phase. In a subsequent inference phase, inference output information (i.e., updated feature information of a target node to be updated) corresponding to input information (i.e., feature information of edges connected to the feature information of contiguous nodes) of inference graphic data may be derived through the established parameter of the update function (f). As the number of training graphic data increases, the graph neural network (GNN) can derive much more precise inference output data.

Since all nodes are updated in the inference phase, the number of first edges connected to the contiguous nodes may be changed every time. Similarly, even in the training phase, input information, i.e., information about the number of contiguous nodes and information about the number of first edges, may be changed every time. The graph neural network (GNN) may train the update function (f) using a different number of input signals every time.

At this time, the update function (f) may also use unprocessed distance information (raw distance information) selected from among the second feature information of the first edges (E1a~E1m) as needed. That is, the shorter the distance between two first nodes, the higher the weight. As a result, the first feature information of the first nodes can be more precisely updated.

For example, the update function (f) may be configured in a manner that all the first feature information of the contiguous nodes is summed and the sum of the first feature information then passes through a multilayer perceptron (MLP). However, the scope or spirit of the present disclosure is not limited thereto.

Step S220 for establishing one or more parameters of the readout function (g) will hereinafter be described with reference to FIGS. 7 and 8.

The readout function (g) may be trained in plural training graphic data over the graph neural network (GNN), such that one or more parameters of the readout function (g) can be decided and established. In other words, one or more parameters of the readout function (g) in the graph neural network (GNN) may be established to estimate the relationship between input information (i.e., the first feature information of all the first nodes (N1a~N1i)) and output information (i.e., the training output data (Output_T)) in the first graphic data (GData_Ta). In this case, the training output data (Output_T) may be configured in the form of a label such that the label-shaped training output data (Output_T) may be included in the training graphic data.

That is, the graph neural network (GNN) may establish one or more parameters of the readout function (g) through a plurality of training graphic data sets in the training phase. In a subsequent inference phase, the graph neural network (GNN) can acquire inference output data corresponding to input information of the inference graphic data through the established parameters of the readout function (g). As the number of training graphic data sets increases, the graph neural network (GNN) can acquire much more precise inference output data.

Since the number of nodes may be changeable per graphic data in the inference phase, the number of first nodes to be used as input information in the training phase may also be changeable every time. In the graph neural network (GNN), the readout function (g) can be trained through a different number of inputs every time.

For example, the readout function (g) may be configured to acquire a single scalar value by allowing the first feature information of all the first nodes to pass through the multilayer perceptron (MLP). However, the scope or spirit of the present disclosure is not limited thereto.

Referring back to FIG. 7, the image analysis method for use in the image analysis system according to the present disclosure may include establishing (S210) one or more parameters of the update function, and establishing (S220) one or more parameters of the readout function. In this case, the establishing step S210 and the other establishing step S220 may be carried out in a parallel manner. In this case, although the update function (f) and the readout function (g) are performed independently from each other, parameters of the update function (f) and parameters of the readout function (g) can be determined while affecting each other.

Referring back to FIG. 3, the inference graphic data corresponding to the inference tissue slide image may be extracted (S300).

Figure 9:
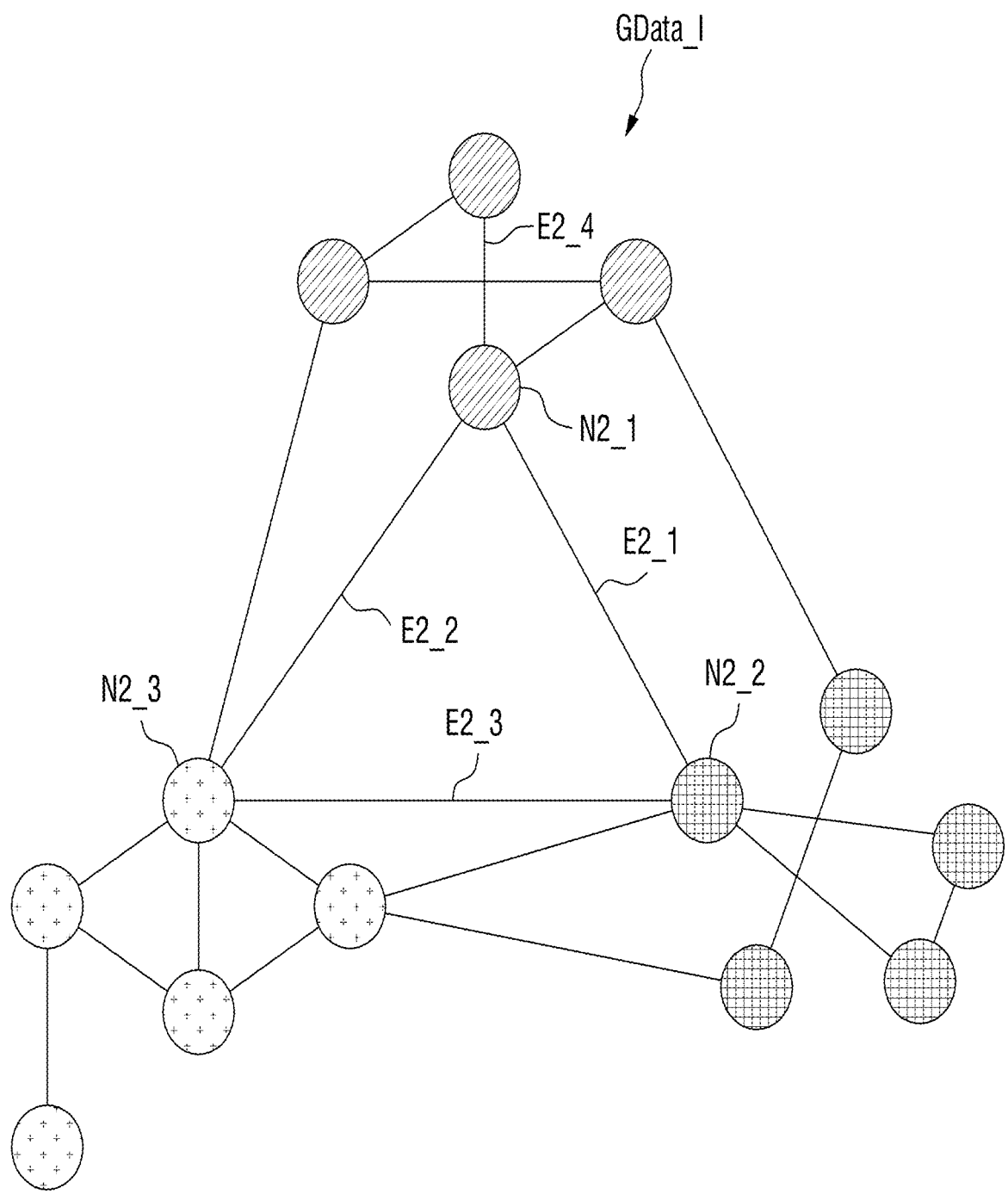
FIG. 9 is a conceptual diagram illustrating an example of inference graphic data applied to the system and method for analyzing images according to some embodiments of the present disclosure.

FIG. 9 is a conceptual diagram illustrating an example of inference graphic data applied to the system and method for analyzing images according to some embodiments of the present disclosure.

In more detail, as shown in FIGS. 1, 2, 5, 6 and 9, the inference graphic data (GData_I) may include second nodes (N2_1, N2_2, N2_3) corresponding to histological features of the inference tissue slide image (WSI_I). If the image of FIG. 2 is the inference tissue slide image (WSI_I), each of the second nodes (N2_1, N2_2, N2_3) may be a portion corresponding to the mark (M). The training graphic data (GData_T) may include a plurality of second nodes (N2_1, N2_2, N2_3). The second nodes (N2_1, N2_2, N2_3) may be classified into second sub-nodes (N2_1, N2_2, N2_3) having different classes. In more detail, the second nodes may be classified into the 2_1 node (N2-1), the 2_2 node (N2_2), and the 2_3 node (N2_3) having different classes.

In this case, although the second nodes (N2_1, N2_2, N2_3) have three classes for convenience of description and better understanding of the present disclosure, the scope or spirit of the present disclosure is not limited thereto. That is, the number of classes of the second nodes (N2_1, N2_2, N2_3) may be set to 4 or greater, or may be less than 3.

The inference graphic data (GData_I) may be formed by embedding third feature information into each of the second nodes (N2_1, N2_2, N2_3) in the same manner as in the training graphic data. The third feature information may include at least one of class information, tissue information, position information, and shape information in the same manner as in the first feature information (Feature 1) of FIG. 5.

The inference graphic data (GData_I) may include second edges (E2_1, E2_2, E2_3, E2_4). The second edges (E2_1, E2_2, E2_3, E2_4) may be defined by the relationship between the second nodes (N2_1, N2_2, N2_3). Each of the second edges (E2_1, E2_2, E2_3, E2_4) may be represented by a segment for interconnecting two first nodes (N2_1, N2_2, N2_3). The second edges (E2_1, E2_2, E2_3, E2_4) may include the 2_1 edge (E2-1), the 2_2 edge (E2_2), and the 2_3 edge (E2_3). The 2_1 edge (E2-1), the 2_2 edge (E2_2), and the 2_3 edge (E2_3) may be respectively connected to the second nodes (N2_1, N2_2, N2_3) having different classes. In more detail, the 2_1 edge (E2_1) may connect the 2_1 node (N2_1) to the 2_2 node (N2_2). The 2_2 edge (E2_2) may connect the 2_1 node (N2_1) to the 2_3 node (N2_3). The 2_3 edge (E2_3) may connect the 2_2 node (N2_2) to the 2_3 node (N2_3).

Of course, the second edges (E2_1, E2_2, E2_3, E2_4) may further include another edge (i.e., the 2_4 edge (E2_4)) through which the 2_1 nodes (N2_1), the 2_2 nodes (N2_2), or the 2_3 nodes (N2_3) are interconnected.

Fourth feature information may be embedded in each of the second edges (E2_1, E2_2, E2_3, E2_4). The fourth feature information may include at least one of distance information (Distance) and similarity information (Similarity) in the same manner as in the second feature information (Feature 2) of FIG. 6. The inference graphic data (GData_I) does not include label-shaped inference output data differently from the training graphic data, and may be derived through the image analysis device 10.

Referring back to FIG. 3, inference output data may be derived through the graph neural network (GNN) (S400).

Figure 10:
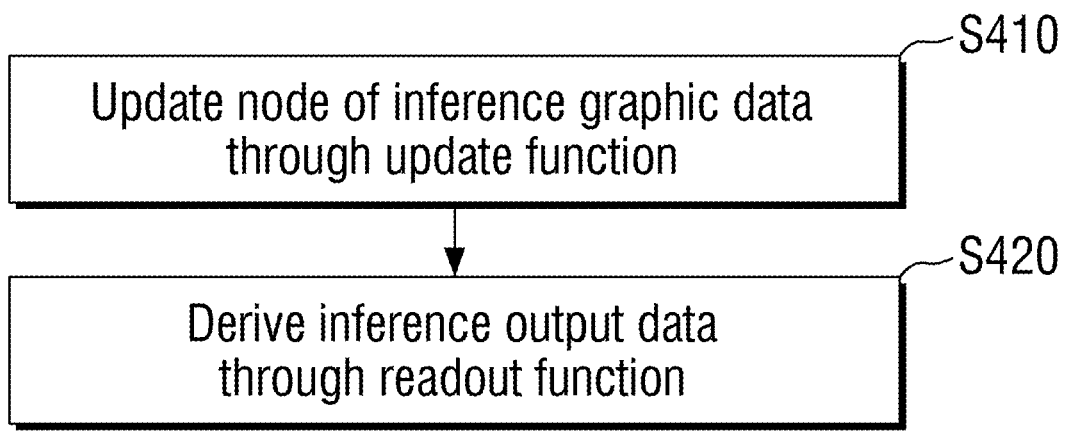
FIG. 10 is a flowchart illustrating a method for deriving inference output data shown in FIG. 3 according to the present disclosure.
Figure 11:
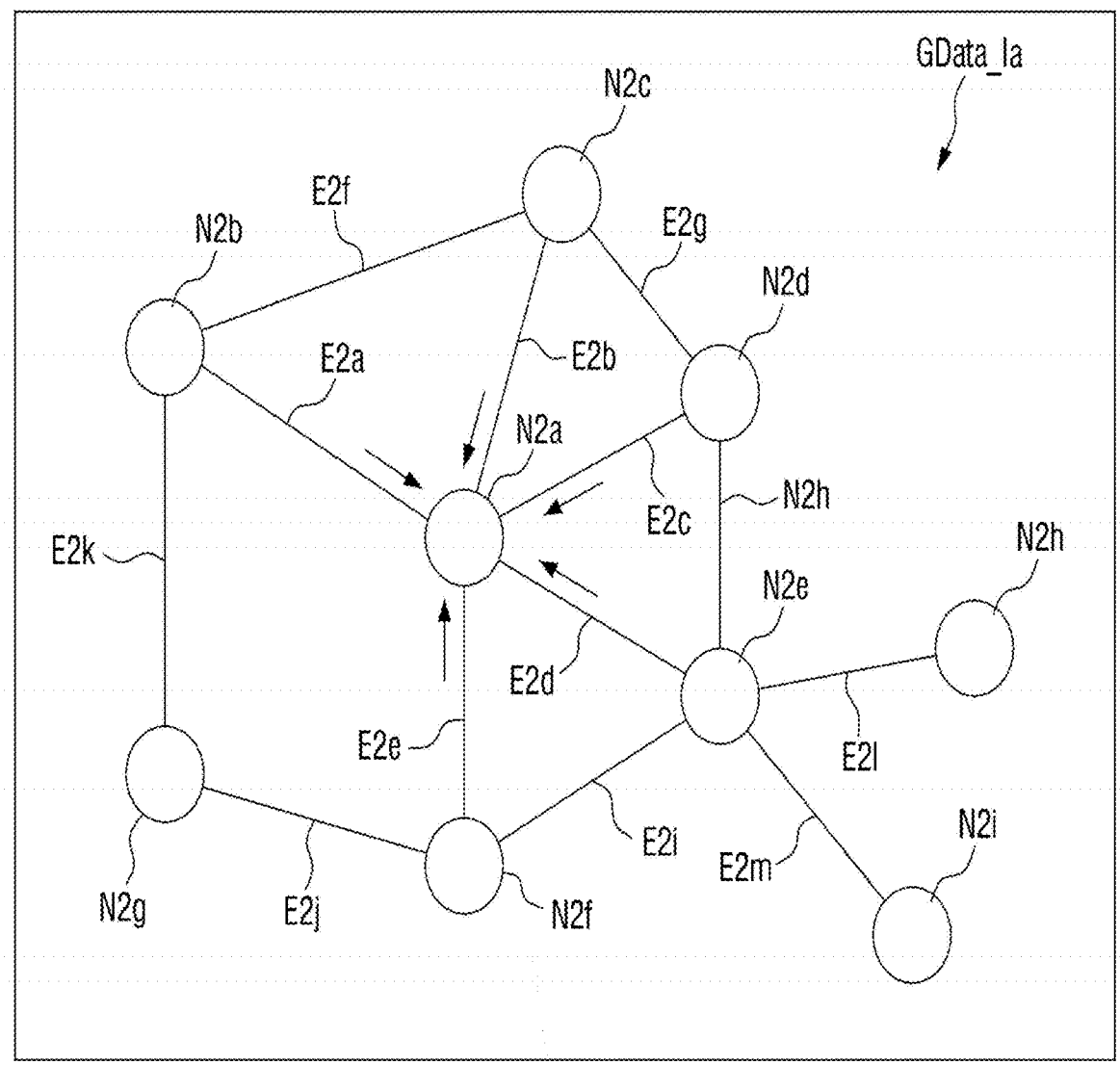
FIG. 11 is a conceptual diagram illustrating a method for updating nodes of inference graphic data and a method for reading out the output data according to the present disclosure.

FIG. 10 is a flowchart illustrating a method for deriving inference output data shown in FIG. 3 according to the present disclosure. FIG. 11 is a conceptual diagram illustrating a method for updating nodes of inference graphic data and a method for reading out the output data according to the present disclosure.

Referring to FIG. 10, nodes of the inference graphic data can be updated through the update function (S410).

Referring to FIG. 11, the second graphic data (GData_Ia) may include a plurality of second nodes (N2a~N2i) and a plurality of second edges (E2a~E2m). Here, the second nodes (N2a~N2i) may be connected to one another through the plurality of second edges (E2a~E2m). Although the second graphic data (GData_Ta) of FIG. 11 includes 9 second nodes (N2a~N2i) and 14 second edges (E2a~E2m) for convenience of description, the scope or spirit of the present disclosure is not limited thereto. The second graphic data (GData_Ta) may correspond to the inference graphic data (GData_I) of FIG. 9.

The second_a node (N2a) may receive the third feature information of the contiguous nodes (i.e., the second_b node (N2b), the second_c node (N2c), the second_d node (N2d), the second_e node (N2e), and the second_f node (N2f)) and the fourth feature information of the second_a edge (E2a), the second_b edge (E2b), the second_c edge (E2c), the second_d edge (E2d), and the second_e edge (E2e) as input information, thereby updating the third feature information of the second_a node (N2a) through the update function (f).

Similarly to the second_a node (N2a), the other second nodes (N2b~N2i) may also be updated using the update function (f), the third feature information of the contiguous nodes, and the fourth feature information of the second edges connected to the contiguous nodes. The third feature information of all the second nodes (N2a~N2i) may be updated at the same time. In other words, all of the third feature information of the contiguous nodes that are used to update the third feature information may be used as a value obtained prior to update of such third feature information. As a result, noise of data can be minimized and deformation of unnecessary data can be prevented. However, the scope or spirit of the present disclosure is not limited thereto.

The third feature information of all the second nodes (N2a~N2i) may be configured in the form of a vector. That is, the third feature information may include a plurality of elements. During update of the third feature information, the system and method for analyzing images according to the present embodiment may generate new elements, and may also change values of the existing elements as needed. That is, updating of the third feature information may change at least one of the number of vector elements and the content of a vector.

On the other hand, the update function (f) may also use unprocessed distance information (i.e., raw distance information) selected from among the fourth feature information of the second edges (E2a~E2m). That is, the shorter the distance between two second nodes, the higher the weight. As a result, the third feature information of the second nodes can be more precisely updated.

Referring back to FIG. 10, the inference output data may be derived through the readout function (S420).

In more detail, referring to FIG. 11, the third feature information of the second nodes (N2a~N2i) may be used as input information, and the inference output data (Output_I) may be derived through the readout function (g).

For example, the readout function (g) may be configured to acquire a single scalar value by allowing the third feature information of all the second nodes to pass through the multilayer perceptron (MLP). However, the scope or spirit of the present disclosure is not limited thereto. The inference output data (Output_I) of the single scalar value in the inference phase may be values about the pathological diagnosis and medical prediction results as shown in FIG. 1.

The inference output data (Output_I) derived based on the present disclosure may be a probability about the presence or absence of anticancer drug responses in patients. That is, it is possible to predict whether the patient of the inference tissue slide image (WSI_I) shown in FIG. 1 reacts to the anticancer drug. Alternatively, the inference output data (Output_I) derived based on the present disclosure may also denote the patient's residual lifetime expected after completion of a particular medical treatment. That is, the image analysis device 10 shown in FIG. 10 may derive medical prediction using only the inference tissue slide image (WSI_I) without using expertise. The system and method for analyzing images according to the present embodiments may use deep learning technology using graphic data that is significantly smaller in size than the existing tissue slide image. The existing tissue slide image may include the number of $10^9$-scale pixels and the number of $10^6$-scale cells. Accordingly, in the case of using graphic data corresponding to histological features, image analysis can be performed based on smaller data that is reduced by a predetermined size corresponding to a unit of $10^3$. The difference in scale may greatly improve the accuracy, speed, and efficiency of image analysis based on deep learning technology. In addition, threshold requirements of resources needed for image analysis based on deep learning can be greatly reduced in number, resulting in increased ease of image analysis.

Furthermore, the system and method for analyzing images according to some embodiments of the present disclosure may allow the graph neural network (GNN) to autonomously train feature information of each node, may update the feature information, and may derive the final output data using the updated feature information. As a result, expertise needed to select the feature information may not be required as necessary. That is, in order to recognize information about which feature information affects the image analysis result using the traditional machine learning method, the traditional machine learning method should first perform the image analysis task based on high-level expertise so as to derive desired appropriate results. In contrast, the system and method for analyzing images according to the present embodiments may allow the graph neural network (GNN) to autonomously update feature information using according to a minimum amount of selected feature information as well as to acquire the desired results, such that threshold requirements of expertise needed for tissue slide image analysis can be greatly reduced in number.

The system and method for analyzing images according to some embodiments of the present disclosure will hereinafter be described with reference to FIGS. 4, 9 and 12. In the following description, the same parts as those of the above-described embodiment will be briefly described or omitted for convenience of description.

Figure 12:
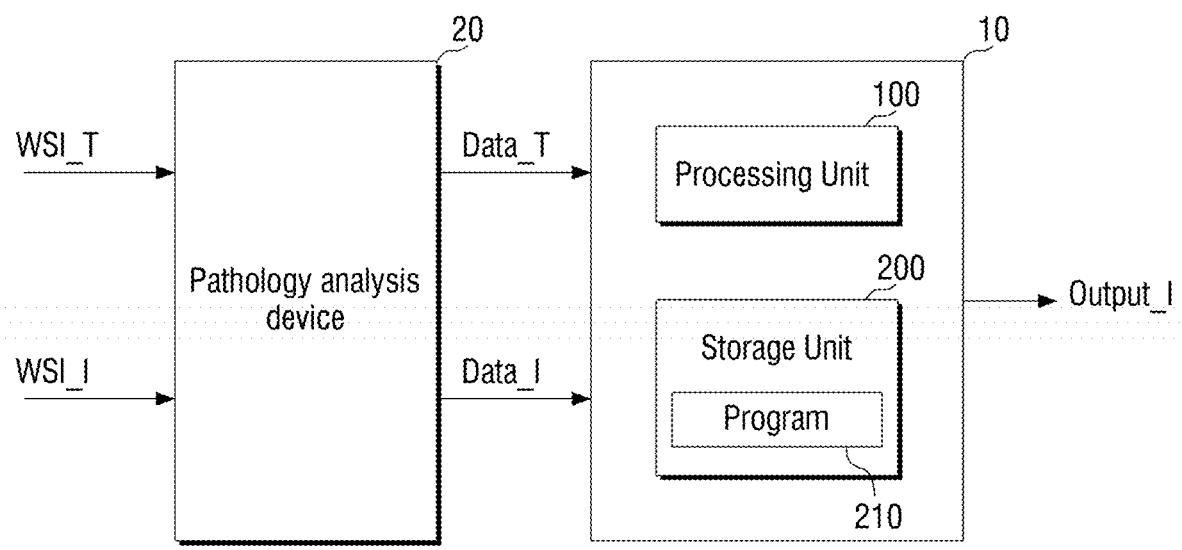
FIG. 12 is a block diagram illustrating an image analysis system according to some embodiments of the present disclosure.

FIG. 12 is a block diagram illustrating the image analysis system according to some embodiments of the present disclosure.

Referring to FIG. 12, the image analysis system according to some embodiments of the present disclosure may include an image analysis device 10 and a pathology analysis device 20.

The pathology analysis device 20 may receive the training tissue slide image (WSI_T) and the inference tissue slide image (WSI_I). The pathology analysis device 20 may extract training data (Data_T) from the training tissue slide image (WSI_T), and may extract inference data (Data_I) from the inference tissue slide image (WSI_I).

The training data (Data_T) may be required to generate the training graphic data (GData_T) of FIG. 4. The inference data (Data_I) may be required to generate the inference graphic data (GData_I) of FIG. 9.

The image analysis device 10 may receive the training data (Data_T) and the inference data (Data_I) from the pathology analysis device 20. The image analysis device 10 may generate the training graphic data (GData_T) of FIG. 4 and the inference graphic data (GData_I) of FIG. 9, such that the image analysis device 10 can derive the inference output data (Output_I).

The system and method for analyzing images according to some embodiments of the present disclosure will hereinafter be described with reference to FIGS. 1 to 3 and FIGS. 13 to 16. In the following description, the same parts as those of the above-described embodiment will be briefly described or omitted for convenience of description.

Figure 13:
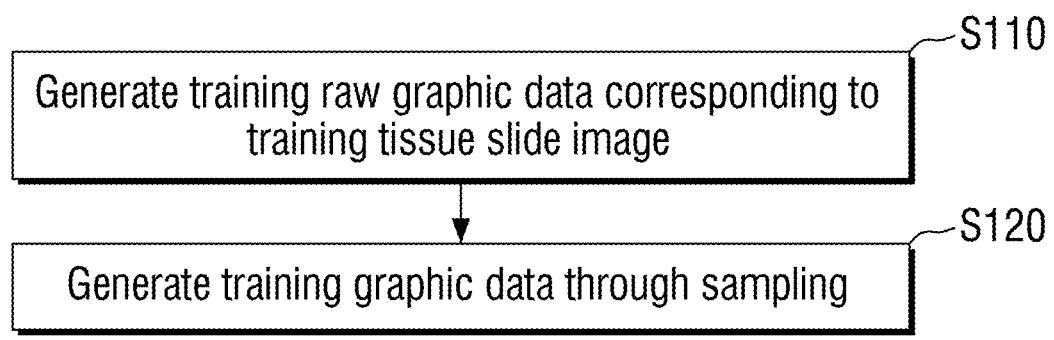
FIG. 13 is a detailed flowchart illustrating an image analysis method for use in the image analysis system according to some embodiments of the present disclosure.
Figure 14:
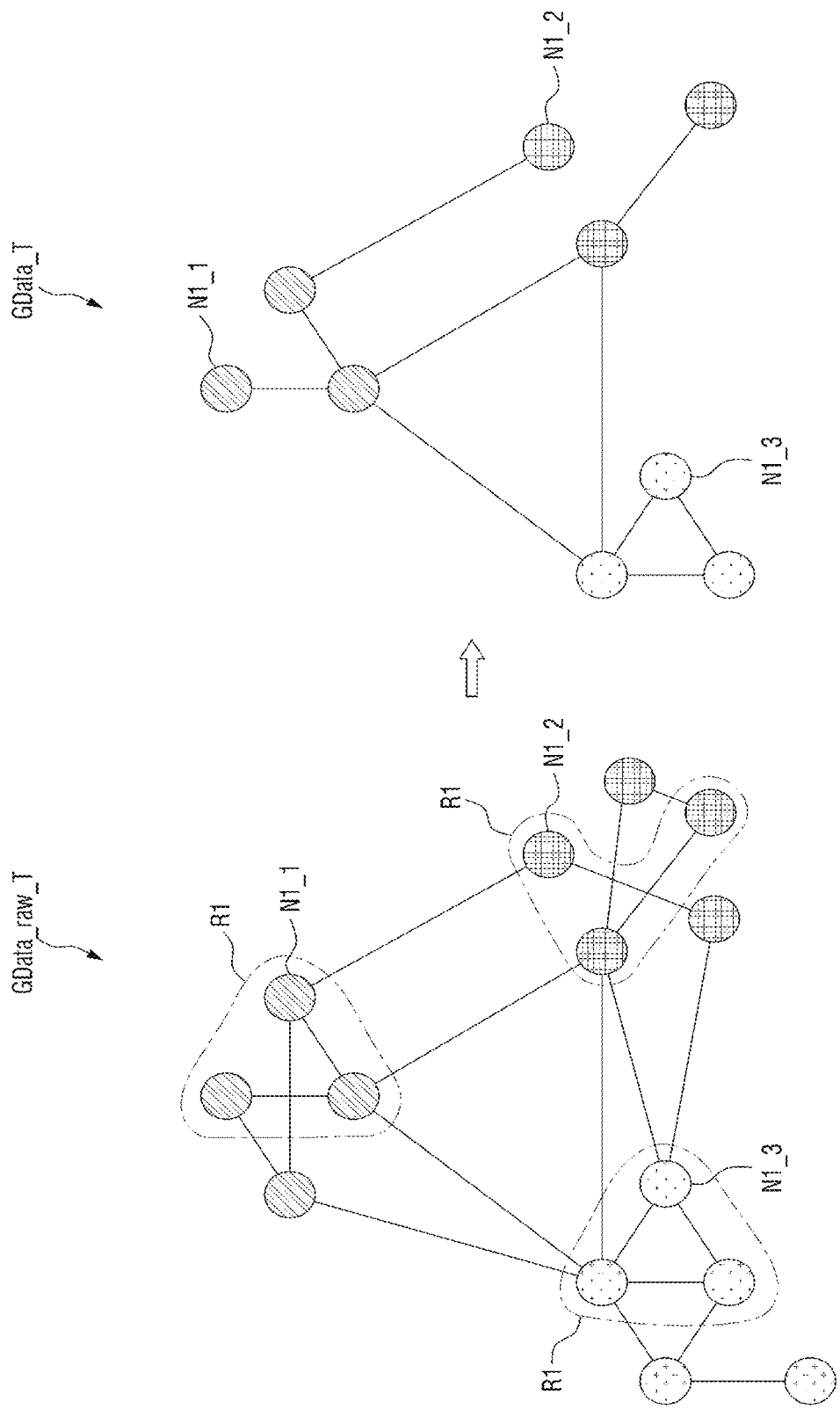
FIG. 14 is a conceptual diagram illustrating a method for sampling training raw graphic data according to the present disclosure.
Figure 15:
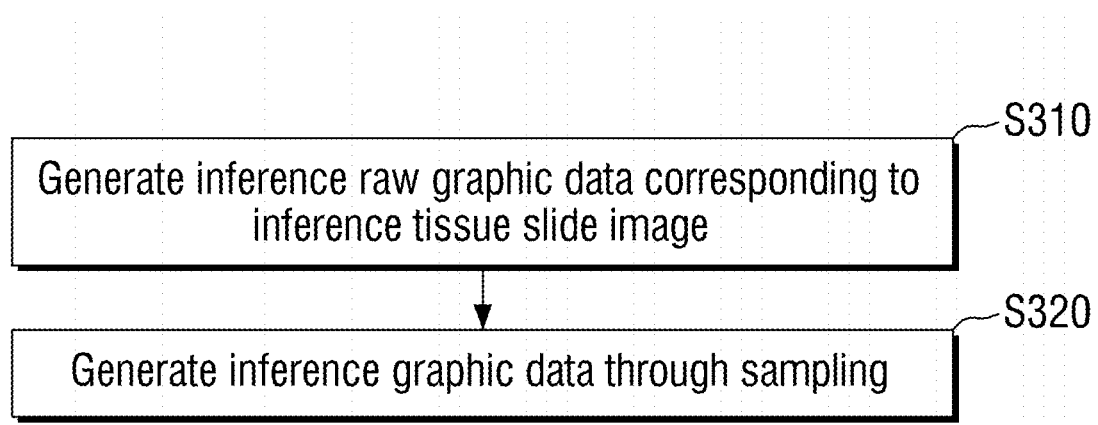
FIG. 15 is a detailed flowchart illustrating an image analysis method for use in the image analysis system according to some embodiments of the present disclosure.
Figure 16:
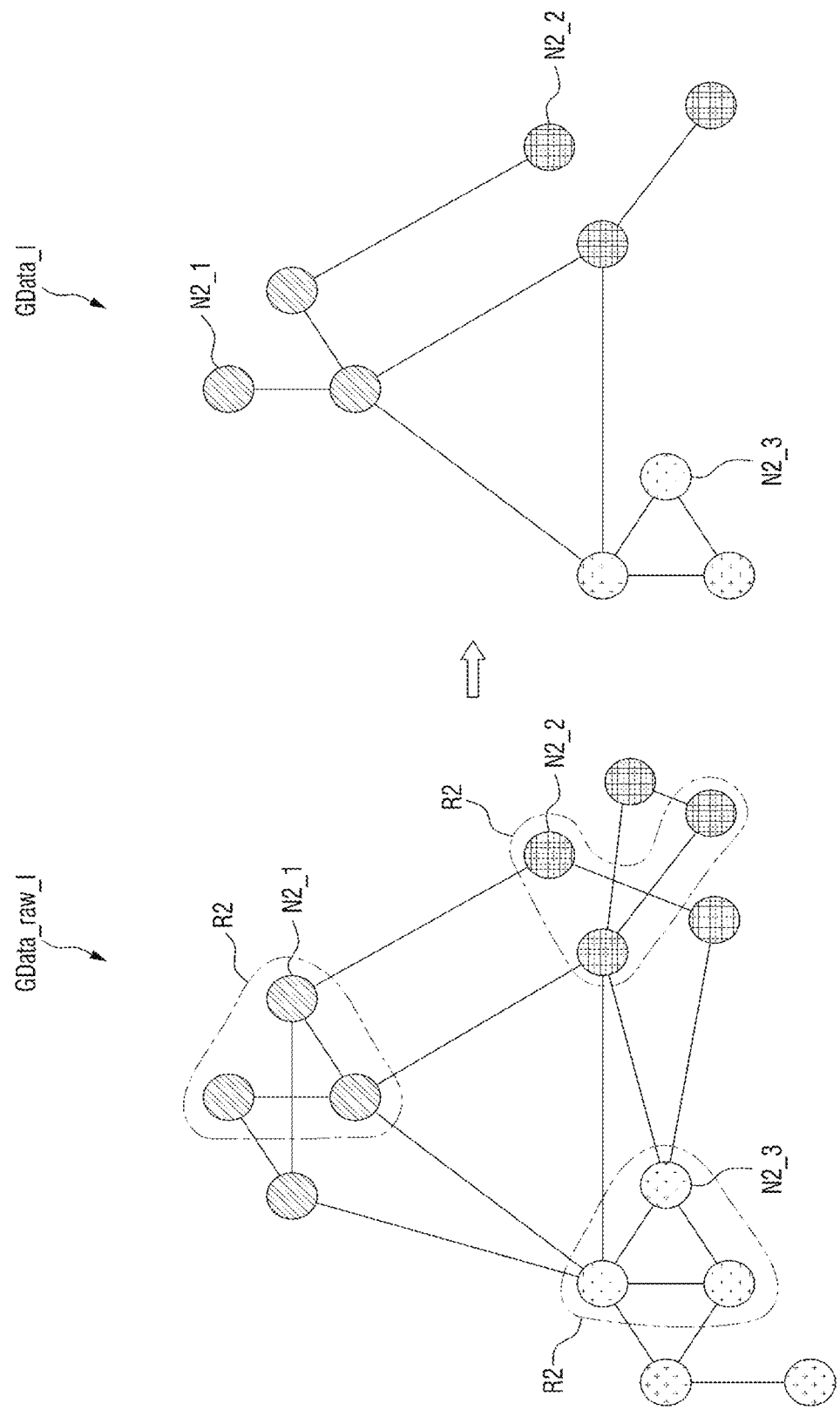
FIG. 16 is a conceptual diagram illustrating a method for sampling training raw graphic data according to the present disclosure.

FIG. 13 is a detailed flowchart illustrating an image analysis method for use in the image analysis system according to some embodiments of the present disclosure. FIG. 14 is a conceptual diagram illustrating a method for sampling training raw graphic data according to the present disclosure. FIG. 15 is a detailed flowchart illustrating an image analysis method for use in the image analysis system according to some embodiments of the present disclosure. FIG. 16 is a conceptual diagram illustrating a method for sampling training raw graphic data according to the present disclosure.

FIG. 13 is a flowchart illustrating the step S100 for extracting the training graphic data of FIG. 3. FIG. 15 is a flowchart illustrating the step S300 for extracting the inference graphic data of FIG. 3.

Referring to FIGS. 3 and 13, training raw graphic data corresponding to the training tissue slide image may be generated (S110).

In more detail, the training raw graphic data (GData_raw_T) of FIG. 14 may correspond to the training graphic data (GData_T) of FIG. 4.

Referring back to FIG. 13, the training graphic data may be generated through sampling (S120).

In more detail, as shown in FIG. 14, the training raw graphic data (GData_raw_T) may include a first region (R1). The first region (R1) may be a region including the first nodes (N1_1, N1_2, N1_3) that are maintained through sampling. The first nodes (N1_1, N1_2, N1_3) located in a region other than the first region (R1) may be removed. From among the first edges (E1_1, E1_2, E1_3, E1_4), only some edges through which the first nodes (N1_1, N1_2, N1_3) contained in the first region (R1) are interconnected may remain unchanged, and the remaining edges other than the some edges may be removed. By the above-described sampling, the training raw graphic data (GData_raw_T) may be changed to the training graphic data (GData_T).

The above-described sampling may be random sampling. That is, some of the plurality of first nodes (N1_1, N1_2, N1_3) may be removed at random, and only some other first nodes (N1_1, N1_2, N1_3) that remain unchanged may be included in the first nodes (N1_1, N1_2, N1_3) of the training graphic data (GData_T). However, the scope or spirit of the present disclosure is not limited thereto. That is, sampling may be performed in a predetermined manner rather than a random manner.

The above-described sampling may be performed entirely on the first nodes (N1_1, N1_2, and N1_3). As a result, sampling can be easily performed without using any other manipulations, such that the speed and efficiency of the system and method for analyzing images according to the present embodiment can be significantly increased.

Alternatively, the above-described sampling may also be performed for each class. That is, the 1_1 node (N1_1), the 1_2 node (N1_2), and the 1_3 node (N1_3) having different classes may be sampled independently from each other. That is, some parts of the 1_1 node (N1_1) may be sampled, some parts of the 1_2 node (N1_2) may be sampled, and some parts of the 1_3 node (N1_3) may be sampled. In this case, the first nodes (N1_1, N1_2, N1_3) to be removed may have uniform density, such that deformation of characteristics of the training graphic data (GData_T) can be minimized. As a result, precision of the system and method for analyzing images according to the present embodiment can be maintained.

In addition, the system and method for analyzing images according to some embodiments of the present disclosure can use a scheme for sampling only the first nodes and maintaining the first edges interposed between the remaining first nodes other than the sampled first node, but also another scheme for sampling only the first edges as needed. In addition, sampling of the first node may be performed first, and the remaining first edges may be re-sampled as needed.

In conclusion, not only the first feature information of the first nodes, but also the second feature information of the first edges may be used as a target object to be sampled.

Referring to FIG. 15, the inference raw graphic data corresponding to the inference tissue slide image may be generated (S310).

In more detail, the inference raw graphic data (GData_raw_I) of FIG. 16 may correspond to the inference graphic data (GData_I) of FIG. 9.

Referring back to FIG. 15, inference graphic data may be generated through sampling (S320).

In more detail, the inference raw graphic data (GData_raw_I) of FIG. 16 may include a second region (R2). The second region (R2) may be a region including the second nodes (N2_1, N2_2, N2_3) that are maintained through sampling. The second nodes (N2_1, N2_2, N2_3) located in a region other than the second region (R2) may be removed. From among the second edges (E2_1, E2_2, E2_3, E2_4), only some edges through which the second nodes (N2_1, N2_2, N2_3) contained in the second region (R2) are interconnected may remain unchanged, and the remaining edges other than the some edges may be removed. By the above-described sampling, the inference raw graphic data (GData_raw_I) may be changed to the inference graphic data (GData_I).

The above-described sampling may be random sampling. That is, some of the plurality of second nodes (N2_1, N2_2, N2_3) may be removed at random, and only some other second nodes (N2_1, N2_2, N2_3) that remain unchanged may be included in the second nodes (N2_1, N2_2, N2_3) of the inference graphic data (GData_I). However, the scope or spirit of the present disclosure is not limited thereto. That is, sampling may also be performed in a predetermined manner rather than a random manner.

The above-described sampling may be performed entirely on the second nodes (N2_1, N2_2, and N2_3). As a result, sampling can be easily performed without using any other manipulations, such that the speed and efficiency of the system and method for analyzing images according to the present embodiment can be significantly increased.

Alternatively, the above-described sampling may also be performed for each class. That is, the 2_1 node (N2_1), the 2_2 node (N2_2), and the 2_3 node (N2_3) having different classes may be sampled independently from each other. In this case, the first second nodes (N2_1, N2_2, N2_3) to be removed may have uniform density, such that deformation of characteristics of the training graphic data (GData_T) can be minimized. As a result, precision of the system and method for analyzing images according to the present embodiment can be maintained.

In addition, the system and method for analyzing images according to some embodiments of the present disclosure can use a scheme for sampling only the second nodes and maintaining the second edges interposed between the remaining second nodes other than the sampled second node, but also another scheme for sampling only the second edges as needed. In addition, sampling of the second node may be performed first, and the remaining second edges may be re-sampled as needed.

In conclusion, not only the third feature information of the second nodes, but also the fourth feature information of the second edges may be used as a target object to be sampled.

The system and method for analyzing images according to the present embodiment may reduce the number of calculations needed for deep learning analysis by reducing the amount of graphic data using sampling. That is, the number of nodes and the number of edges in the training graphic data (GData_T) may be reduced and the number of nodes and the number of edges in the inference graphic data (GData_I) may be reduced, such that the accuracy and speed of image analysis can be improved.

The system and method for analyzing images according to some embodiments of the present disclosure will hereinafter be described with reference to FIGS. 1, 3, 13, 15, and 17 to 19. In the following description, the same parts as those of the above-described embodiment will be briefly described or omitted for convenience of description.

Figure 17:
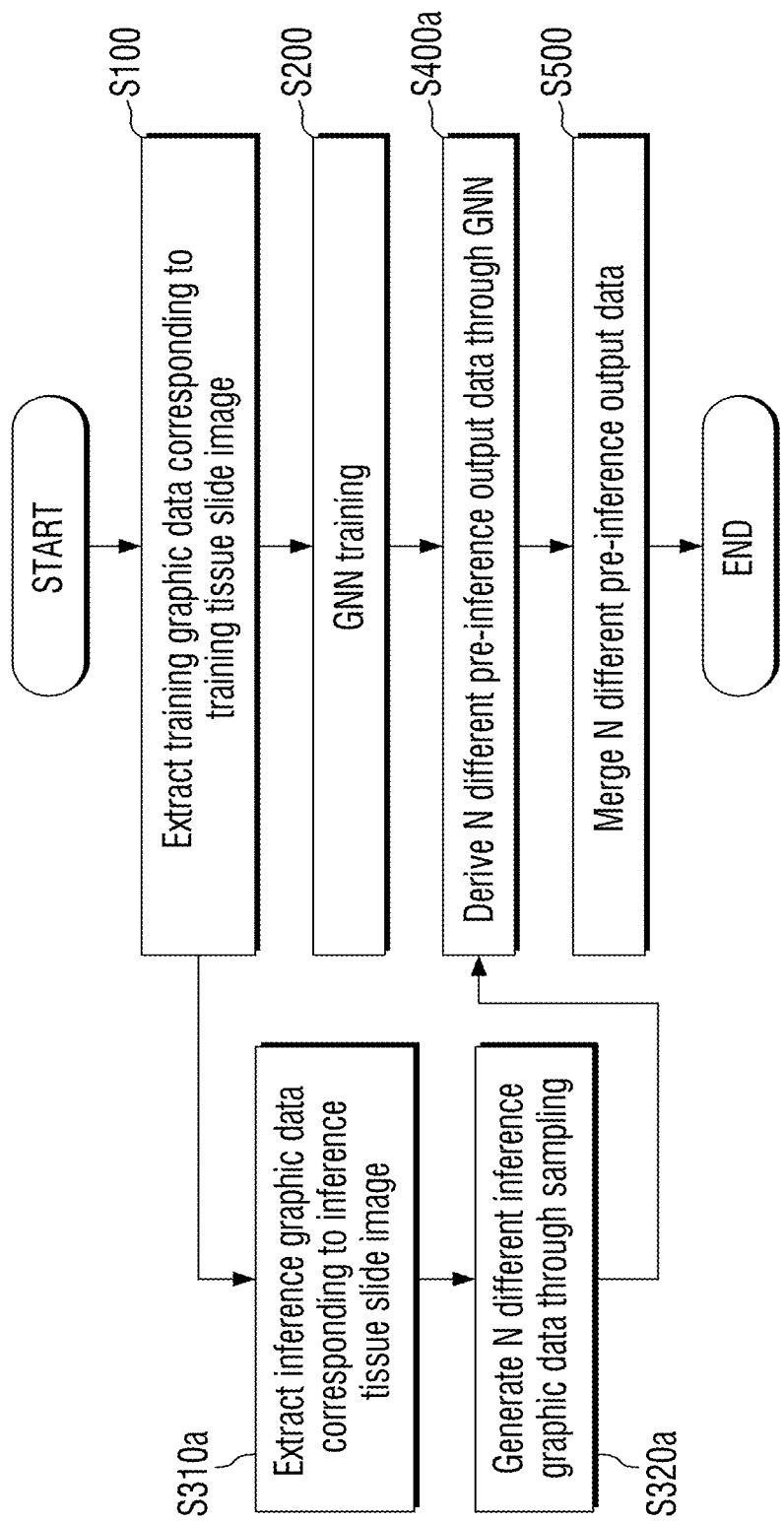
FIG. 17 is a detailed flowchart illustrating an image analysis method for use in the image analysis system according to some embodiments of the present disclosure.
Figure 18:
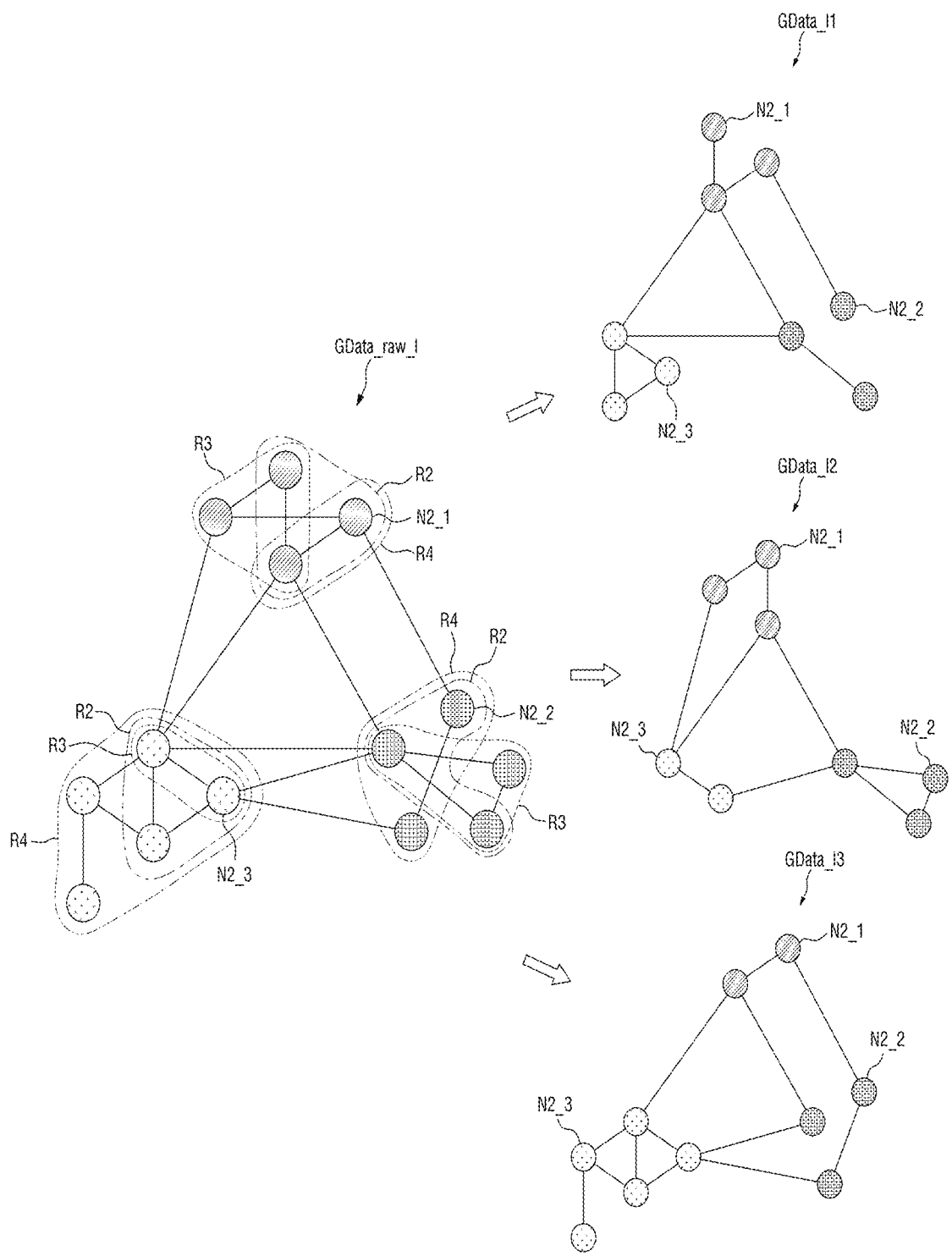
FIG. 18 is a conceptual diagram illustrating a method for sampling inference raw graphic data according to the present disclosure.
Figure 19:
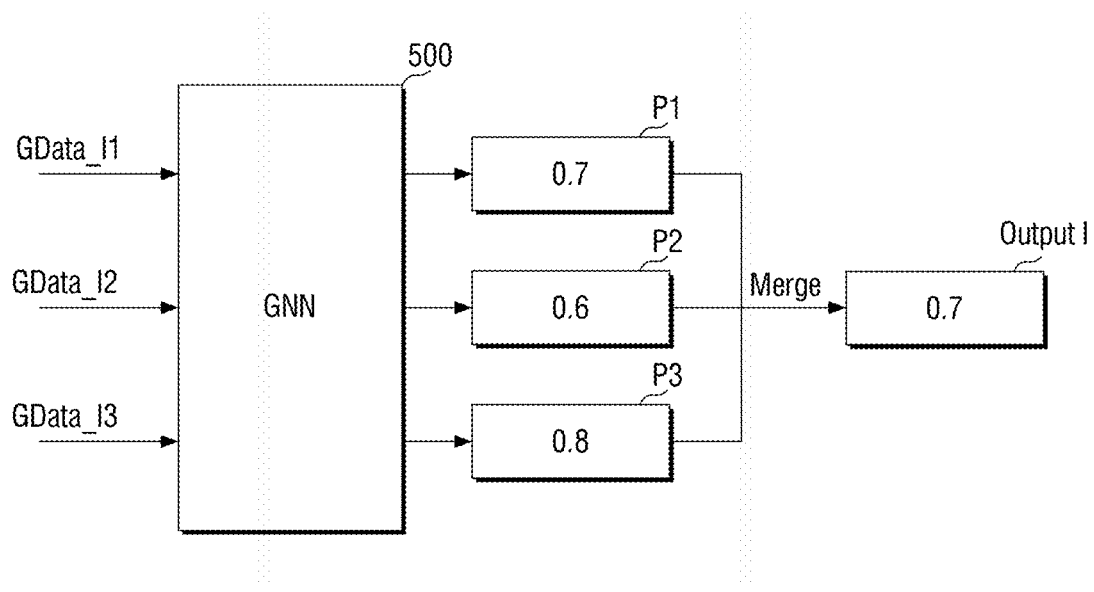
FIG. 19 is a conceptual diagram illustrating a method for merging pre-inference output data according to the present disclosure.

FIG. 17 is a detailed flowchart illustrating an image analysis method for use in the image analysis system according to some embodiments of the present disclosure. FIG. 18 is a conceptual diagram illustrating a method for sampling inference raw graphic data according to the present disclosure. FIG. 19 is a conceptual diagram illustrating a method for merging pre-inference output data according to the present disclosure.

Referring to FIG. 17, the step S100 of extracting graphic data and the step S200 of training the graph neural network (GNN) are identical to those of FIG. 3. In this case, the step S100 of extracting the graphic data in FIG. 3 may include the step S110 of generating the training raw graphic data of FIG. 13 and the step S120 of generating the training graphic data of FIG. 13.

The step S300 of extracting the inference graphic data of FIG. 3 may be classified into the following two steps shown in FIG. 17.

Referring to FIG. 17, the inference raw graphic data corresponding to the inference tissue slide image may be generated (S310a). The step S310a of FIG. 17 is identical to the step S310 of generating the inference raw graphic data of FIG. 15.

Subsequently, N different inference graphic data may be generated through sampling (S320a).

In more detail, referring to FIG. 18, one inference raw graphic datum may be sampled several times, resulting in formation of plural inference graphic data (GData_I1~GData_I3). Although FIG. 18 illustrates an example case of N=3 for convenience of description, the scope or spirit of the present disclosure is not limited thereto.

In more detail, the first inference graphic data (GData_I1) may be generated in a manner that only the second nodes (N2_1, N2_2, N2_3) belonging to the second region (R2) remain unchanged and the remaining second nodes (N2_1, N2_2, N2_3) are removed. The second inference graphic data (GData_I2) may be generated in a manner that only the second nodes (N2_1, N2_2, N2_3) belonging to the third region (R3) remain unchanged and the remaining second nodes (N2_1, N2_2, N2_3) are removed. The third inference graphic data (GData_I3) may be generated in a manner that only the second nodes (N2_1, N2_2, N2_3) belonging to the fourth region (R4) remain unchanged and the remaining second nodes (N2_1, N2_2, N2_3) are removed.

Referring back to FIG. 17, N different pre-inference output data may be derived through the graph neural network (GNN) (S400a).

In more detail, referring to FIGS. 1 and 19, pre-inference output data (P1~P3) respectively corresponding to N inference graphic data (GData_I1~GData_I3) can be derived. The step of deriving the respective pre-inference output data (P1~P3) may be identical to the step S400 of deriving the inference output data of FIG. 3.

The graph neural network (GNN) 500 may be implemented by the image analysis system of the present embodiment. The graph neural network (GNN) 500 may receive first inference graphic data (GData_I1), second inference graphic data (GData_I2), and third inference graphic data (GData_I3). The graph neural network (GNN) 500 may derive the first pre-inference output data (P1) from the first inference graphic data (GData_I1), and may derive the second pre-inference output data (P2) from the second inference graphic data (GData_I2). The graph neural network (GNN) 500 may derive the third pre-inference output data (P3) from the third inference graphic data (GData_I3).

Referring back to FIG. 1, N different pre-inference output data may be merged (S500).

In more detail, referring to FIGS. 1 and 19, the image analysis device 10 may merge N pre-inference output data (P1~P3), such that the image analysis device 10 can finally derive the inference output data (Output_I).

In this case, the above-described merging may be achieved by averaging N pre-inference output data (P1~P3).

Alternatively, the above-described merging may use N pre-inference output data (P1~P3) as feature information, so that the graph neural network (GNN) 500 may derive the final inference output data (Output_I) using the trained merge function. In this case, the operation of training the merge function may be carried out in the graph neural network (GNN) training step S200 of FIG. 17.

The system and method for analyzing images according to some embodiments of the present disclosure can reduce the amount of inference graphic data corresponding to input data, and at the same time can derive a value of precise inference output data. That is, N inference graphic data may be acquired from a single inference tissue slide image, such that data deviation or noise generable in data extraction can be minimized. In this case, the higher the N value, the higher the accuracy in image analysis.

The system and method for analyzing images according to some embodiments of the present disclosure will hereinafter be described with reference to FIGS. 1, 3, 13, 15, and 17 to 21. In the following description, the same parts as those of the above-described embodiment will be briefly described or omitted for convenience of description.

Figure 20:
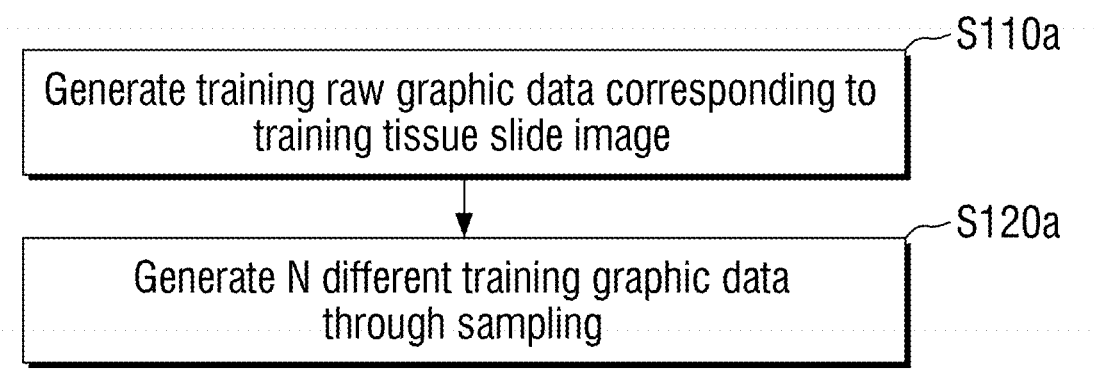
FIG. 20 is a detailed flowchart illustrating an image analysis method for use in the image analysis system according to some embodiments of the present disclosure.
Figure 21:
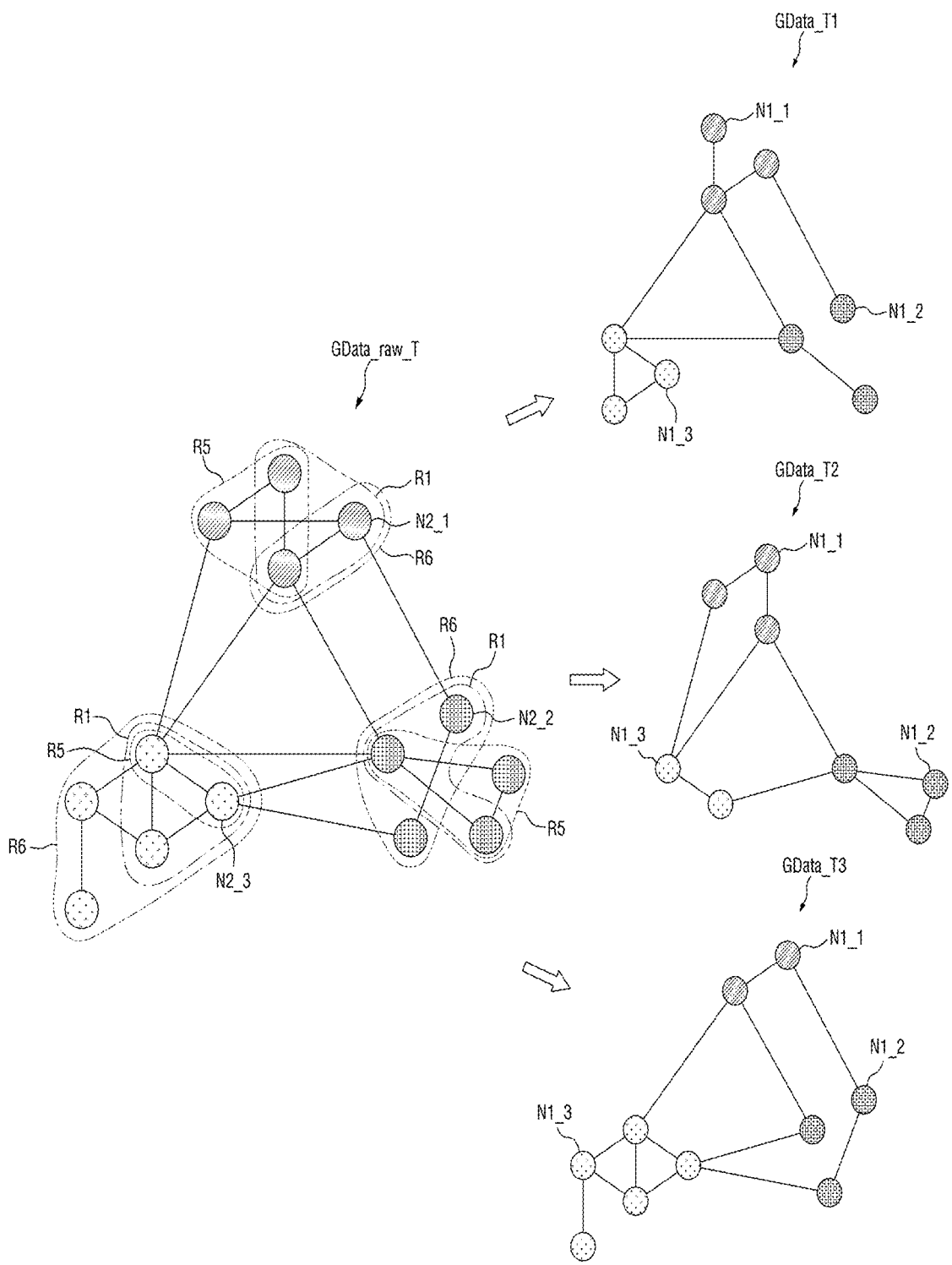
FIG. 21 is a conceptual diagram illustrating a method for sampling training raw graphic data according to the present disclosure.

FIG. 20 is a detailed flowchart illustrating an image analysis method for use in the image analysis system according to some embodiments of the present disclosure. FIG. 21 is a conceptual diagram illustrating a method for sampling training raw graphic data according to the present disclosure.

FIG. 20 is a flowchart illustrating the step S100 of extracting the training graphic data of FIG. 17.

Referring to FIGS. 13, 17 and 20, the step S100 of extracting the training graphic data may be classified into the following two steps.

The training raw graphic data corresponding to the training tissue slide image may be generated (S110a). The step S110a of FIG. 20 is identical to the step S110 of generating the training raw graphic data of FIG. 13.

Subsequently, N different training graphic data may be generated through sampling (S120a).

In more detail, referring to FIG. 21, one training raw graphic datum (GData_raw_T) may be sampled several times, resulting in formation of plural training graphic data (GData_T1~GData_T2). Although FIG. 21 illustrates an example case of N=3 for convenience of description, the scope or spirit of the present disclosure is not limited thereto.

In more detail, the first training graphic data (GData_T1) may be generated in a manner that only the first nodes (N1_1, N1_2, N1_3) belonging to the first region (R1) remain unchanged and the remaining first nodes (N1_1, N1_2, N1_3) are removed. The second training graphic data (GData_T2) may be generated in a manner that only the first nodes (N1_1, N1_2, N1_3) belonging to the fifth region (R5) remain unchanged and the remaining first nodes (N1_1, N1_2, N1_3) are removed. The third training graphic data (GData_T3) may be generated in a manner that only the first nodes (N1_1, N1_2, N1_3) belonging to the sixth region (R6) remain unchanged and the remaining first nodes (N1_1, N1_2, N1_3) are removed.

As is apparent from the above description, the system and method for analyzing images according to embodiments of the present disclosure can generate much more training graphic data while simultaneously reducing the amount of training graphic data corresponding to input data. That is, the image analysis system and method can generate N training graphic data based on a single training tissue slide image, such that training of the graph neural network (GNN) can be further strengthened, resulting in increased precision of the system and method for analyzing images.

In the foregoing, while specific embodiments of the present disclosure have been described for illustrative purposes, the scope or spirit of the present disclosure is not limited thereto, it will be understood by those skilled in the art that various changes and modifications can be made to other specific embodiments without departing from the spirit and scope of the present disclosure. Accordingly, the scope of the present disclosure is limited by the disclosed embodiments, but should be determined by the technical idea set forth in the claims. Although the present disclosure has been described with reference to some embodiments, various changes or modifications can be made by those skilled in the art. Accordingly, it is to be understood that such changes and modifications are within the scope of the invention. Such modifications should not be individually understood from the technical spirit or prospect of the present disclosure. The above embodiments are therefore to be construed in all aspects as illustrative and not restrictive.

What is claimed is:

1. A computer-implemented method for training an analysis model, the method comprising:
   extracting a plurality of features from at least one tissue image;
   defining at least one node corresponding to a first feature from at least one of the plurality of features;

defining at least one edge corresponding to a second feature from at least one of the plurality of features;

training an analysis model for outputting a medical prediction, using graphic data comprising the at least one node and the at least one edge, wherein the analysis model comprises a graph neural network (GNN); and storing the trained analysis model for outputting the medical prediction, wherein the at least one node comprises a first node and a second node, the at least one edge comprises a first edge connecting the first node and the second node, and the second feature corresponding to the first edge comprises at least one of a distance between the first feature corresponding to the first node and the first feature corresponding to the second node or a similarity between the first feature corresponding to the first node and the first feature corresponding to the second node.

2. The method of claim 1, wherein the plurality of features comprise at least one of class information, tissue information, position information, or shape information of histological features from the at least one tissue image.

3. The method of claim 2, wherein defining the at least one node comprises embedding the class information to the at least one node.

4. The method of claim 2, wherein defining the at least one edge comprises embedding information about the second feature to the at least one edge.

5. The method of claim 1, wherein the medical prediction comprises a probability of anticancer drug response in a patient corresponding to the at least one tissue image or a patient's survival time corresponding to the at least one tissue image.

6. The method of claim 1, wherein training the analysis model comprises determining a parameter of a readout function for the medical prediction.

7. The method of claim 1, further comprising outputting the medical prediction of a target tissue image using the analysis model.

8. A system for training an analysis model, the system comprising:

at least one memory storing instructions; and at least one processor configured to execute the instructions to:

extract a plurality of features from at least one tissue image;

define at least one node corresponding to a first feature from at least one of the plurality of features;

define at least one edge corresponding to a second feature from at least one of the plurality of features;

train an analysis model configured to output a medical prediction, using graphic data comprising the at least one node and the at least one edge, wherein the analysis model comprises a graph neural network (GNN); and store the trained analysis model, wherein the at least one node comprises a first node and a second node, the at least one edge comprises a first edge connecting the first node and the second node, and the second feature corresponding to the first edge comprises at least one of a distance between the first feature corresponding to the first node and the first feature corresponding to the second node or a similarity between the first feature corresponding to the first node and the first feature corresponding to the second node.

9. The system of claim 8, wherein the plurality of features comprise at least one of class information, tissue information, position information, or shape information of histological features from the at least one tissue image.

10. The system of claim 9, wherein, to define the at least one node, the at least one processor is configured to embed the class information to the at least one node.

11. The system of claim 9, wherein, to define the at least one edge, the at least one processor is configured to embed information about the second feature to the at least one edge.

12. The system of claim 8, wherein the medical prediction comprises a probability of anticancer drug response in a patient corresponding to the at least one tissue image or a patient's survival time corresponding to the at least one tissue image.

13. The system of claim 8, wherein, to train the analysis model, the at least one processor is configured to determine a parameter of a readout function for the medical prediction.

14. The system of claim 8, wherein the at least one processor is further configured to output the medical prediction of a target tissue image using the analysis model.

15. A non-transitory computer-readable medium storing instructions that, when executed by a processor, cause the processor to perform a method for training an analysis model, the method comprising:

extracting a plurality of features from at least one tissue image;

defining at least one node corresponding to a first feature from at least one of the plurality of features;

defining at least one edge corresponding to a second feature from at least one of the plurality of features;

training an analysis model for outputting a medical prediction, using graphic data comprising the at least one node and the at least one edge, wherein the analysis model comprises a graph neural network (GNN); and storing the trained analysis model for outputting the medical prediction, wherein the at least one node comprises a first node and a second node, the at least one edge comprises a first edge connecting the first node and the second node, and the second feature corresponding to the first edge comprises at least one of a distance between the first feature corresponding to the first node and the first feature corresponding to the second node or a similarity between the first feature corresponding to the first node and the first feature corresponding to the second node.

16. The non-transitory computer-readable medium of claim 15, wherein the plurality of features comprise at least one of class information, tissue information, position information, or shape information of histological features from the at least one tissue image.

17. The non-transitory computer-readable medium of claim 16, wherein defining the at least one node comprises embedding the class information to the at least one node.

18. The non-transitory computer-readable medium of claim 16, wherein defining the at least one edge comprises embedding information about the second feature to the at least one edge.

19. The non-transitory computer-readable medium of claim 15, wherein the medical prediction comprises a probability of anticancer drug response in a patient corresponding to the at least one tissue image or a patient's survival time corresponding to the at least one tissue image.

20. The non-transitory computer-readable medium of claim 15, wherein training the analysis model comprises determining a parameter of a readout function for the medical prediction.

* * * * *